United States Patent
Kawakami et al.

(10) Patent No.: US 9,911,976 B2
(45) Date of Patent: Mar. 6, 2018

(54) NEGATIVE ELECTRODE ACTIVE MATERIAL FOR SECONDARY BATTERY, CONDUCTIVE COMPOSITION FOR SECONDARY BATTERY, NEGATIVE ELECTRODE MATERIAL COMPRISING SAME, NEGATIVE ELECTRODE STRUCTURE AND SECONDARY BATTERY COMPRISING SAME, AND METHOD FOR MANUFACTURING SAME

(71) Applicant: Samsung Electronics Co., Ltd., Suwon-si, Gyeonggi do (KR)

(72) Inventors: Soichiro Kawakami, Daejeon (KR); Ju Myeung Lee, Cheongju-si (KR); Hyun Ju Jung, Seoul (KR); Dong Gyu Chang, Daejeon (KR)

(73) Assignee: SAMSUNG ELECTRONICS CO., LTD, Gyeonggi-Do (KR)

( * ) Notice: Subject to any disclaimer, the term of this patent is extended or adjusted under 35 U.S.C. 154(b) by 0 days.

(21) Appl. No.: 15/673,776

(22) Filed: Aug. 10, 2017

(65) Prior Publication Data

US 2017/0338477 A1    Nov. 23, 2017

Related U.S. Application Data

(62) Division of application No. 14/441,107, filed as application No. PCT/KR2013/012349 on Dec. 27, 2013, now Pat. No. 9,761,869.

(30) Foreign Application Priority Data

Dec. 27, 2012    (KR) .................. 10-2012-0155529

(51) Int. Cl.
*H01M 4/131*    (2010.01)
*H01M 4/36*    (2006.01)
(Continued)

(52) U.S. Cl.
CPC ........... *H01M 4/366* (2013.01); *H01M 4/386* (2013.01); *H01M 4/583* (2013.01); *H01M 4/62* (2013.01);
(Continued)

(58) Field of Classification Search
CPC ....... H01M 4/131; H01M 4/386; H01M 4/625
See application file for complete search history.

(56) References Cited

U.S. PATENT DOCUMENTS 7,141,187 B2    11/2006    Kosuzu et al.
7,316,792 B2    1/2008    Kosuzu et al.
(Continued)

FOREIGN PATENT DOCUMENTS

JP    H117942 A    1/1999
JP    2008112710 A    5/2008
(Continued)

OTHER PUBLICATIONS

Chinese Office Action for Application No. 201380058301.3 dated Dec. 14, 2016.
(Continued)

*Primary Examiner* — Olatunji Godo
(74) *Attorney, Agent, or Firm* — Cantor Colburn LLP

(57) ABSTRACT

The present invention relates to a negative electrode active material for a secondary battery, a conductive composition for a secondary battery, a negative electrode material including the same, a negative electrode structure and secondary battery including the same, and a method for manufacturing the same. The present invention includes: a silicon particle; and an amorphous surface layer formed on the surface of the silicon particle. According to the present invention, the negative electrode structure is formed of a composite of a silicon particle and carbon or lithium ion, the oxygen contents of the solid electrolyte and silicon particles are low, (Continued)

and thus aggregation of silicon particles is inhibited. Therefore, in the event of using the negative electrode structure in a negative electrode, a power storage device such as a lithium secondary battery may have high energy density, high output density, and a longer charging/discharging life cycle.

9 Claims, 10 Drawing Sheets

(51) Int. Cl.
  *H01M 4/62* (2006.01)
  *H01M 4/38* (2006.01)
  *H01M 4/583* (2010.01)
  *H01M 10/0562* (2010.01)
  *H01M 10/052* (2010.01)

(52) U.S. Cl.
  CPC ....... *H01M 4/625* (2013.01); *H01M 10/0562* (2013.01); *H01M 10/052* (2013.01); *H01M 2220/20* (2013.01); *H01M 2300/0071* (2013.01)

(56) References Cited

U.S. PATENT DOCUMENTS

| 7,803,290 | B2 | 9/2010 | Kosuzu et al. |
| 2006/0147797 | A1 | 7/2006 | Wu et al. |
| 2008/0274411 | A1 | 11/2008 | Nakajima et al. |
| 2010/0159331 | A1 | 6/2010 | Lee et al. |
| 2011/0311882 | A1 | 12/2011 | Kim et al. |
| 2012/0328923 | A1 | 12/2012 | Sawai et al. |

FOREIGN PATENT DOCUMENTS

| JP | 2008277231 A | 11/2008 |
| KR | 100489881 B1 | 5/2005 |
| KR | 1020100073506 A | 7/2010 |
| WO | 2006129415 A1 | 12/2006 |
| WO | 2012029386 A1 | 3/2012 |

OTHER PUBLICATIONS

Extended European Search Report for Application No. 13868979.9-1360 dated Jun. 20, 2016.
International Search Report issued in PCT/KR2013/012349 dated May 23, 2014 (4 pages).

NEGATIVE ELECTRODE ACTIVE MATERIAL FOR SECONDARY BATTERY, CONDUCTIVE COMPOSITION FOR SECONDARY BATTERY, NEGATIVE ELECTRODE MATERIAL COMPRISING SAME, NEGATIVE ELECTRODE STRUCTURE AND SECONDARY BATTERY COMPRISING SAME, AND METHOD FOR MANUFACTURING SAME

CROSS REFERENCE TO RELATED APPLICATIONS

This application is a divisional application of U.S. application Ser. No. 14/441,107, filed May 6, 2015, which claims priority to PCT/KR2013/012349, filed on Dec. 27, 2013, which claims priority to Korean Patent Application No. 10-2012-0155529, filed on Dec. 27, 2012, and all the benefits accruing therefrom under 35 U.S.C. § 119, the disclosure of which is incorporated herein in its entirety by reference.

TECHNICAL FIELD

The present invention relates to a negative electrode active material for a secondary battery, a conductive composition for a secondary battery, a negative electrode material including the same, a negative electrode structure and secondary battery including the same, and a method for manufacturing same, and more specifically, to a negative electrode active material including a silicon particle having an amorphous surface layer, or a silicon-carbon composite, a conductive composition for a secondary battery, which includes carbon, a negative electrode material including the same, a negative electrode structure and secondary battery including the same, and a method for manufacturing the same.

BACKGROUND ART

Recently, the amount of $CO_2$ gas contained in the atmosphere has increased, which increases the occurrence of the greenhouse effect causing global warming. Effects of the air pollution due to substances including $CO_2$, $NO_x$, hydrocarbon and the like emitted from automobiles used as transportation means negatively affects the health of people. From the viewpoint of the increase in prices for energy such as crude oil and environmental protection, much expectation has been placed on a smart grid which is a system that optimizes the balance of need for electric power by network management of electric power in a hybrid vehicle, which combines an electric motor and an engine operated by electricity stored in a power storage device, an electric vehicle, and an electric power generation facility, which have high energy efficiency.

Further, even in the information communication field, an information terminal such as a smart phone has rapidly infiltrated into the society due to the ease of exchanging information and sending messages. Under these circumstances, in order to enhance the performance of a smart phone, a hybrid vehicle, an electric vehicle, a smart grid and the like and reduce production costs, it has been expected to develop a power storage device such as a capacitor or a secondary battery, which combines a high electric power density and a high energy density, and a long service life.

Among currently commercially available devices as the power storage device, a device having the highest energy density is a lithium ion secondary battery using carbon such as graphite in the negative electrode and compounds of lithium and a transition metal in the positive electrode. However, since the negative electrode is composed of a carbon material in the "lithium ion battery", only up to $\frac{1}{6}$ of lithium atoms per carbon atom may be theoretically intercalated. For this reason, it is difficult to achieve a new high capacitance battery, and there is a need for a new material for the negative electrode for achieving high capacity. In addition, even though the "lithium ion battery" has high energy density, and thus is expected to be a power source for a hybrid vehicle or an electric vehicle, there is a problem in that the "lithium ion battery" cannot release a sufficient amount of electricity due to high internal resistance of the battery during a rapid discharge, that is, has small output density. For that reason, there is need for the development of a power storage device having high output density and high energy density.

In order to satisfy these demands, studies have been conducted on tin or silicon and an alloy thereof, which may store and release a larger amount of lithium ions than graphite. Tin or silicon may store electrochemically a larger amount of lithium ions, but expands in volume by about 4 times and causes pulverization when expansion and contraction occur due to repeating charge and discharge, thereby causing deterioration in performance of the battery. In order to prevent the aforementioned pulverization, attempts have been conducted for extending the service life of the negative electrode of the battery by grinding silicon or silicon alloys into particulates.

As a method of making the silicon material a particulate, there is a mechanical grinding method, and as a device which may grind the silicon material into a particle size of sub-micron or less, there is a wet beads mill which is a kind of media mill. Grinding by the wet beads mill has problems of (1) reducing the content of oxygen in silicon powder which is a raw material, (2) suppressing oxidation during the grinding, (3) suppressing ground particles from re-aggregating, and (4) suppressing particles from aggregating when the silicon material is ground and then dried.

Patent Documents 1, 2, 3, 4 and 5 disclose methods of using beads mill in grinding silicon or silicon alloys.

Patent Document 1 discloses that (i) Si particles having an average particle diameter ($D_{50}$) of 0.05 to 5 μm are prepared by a wet grinding using a beads mill, (ii) as a solvent to be used, toluene, xylene, mesitylene, methyl naphthalene, creosote oil and the like which are inert to Si are used, and (iii) a wet-mixing heat treatment is performed by adding ground Si particles and a carbon material or a precursor thereof. However, there are problems in that when Si particles are mixed with a carbon material or a precursor thereof before the heat treatment, an oxygen source has not completely been removed, and accordingly, Si particles are oxidized, Si particles having a particle diameter of 0.05 to 5 μm aggregate in a heat treatment, and accordingly, the charging/discharging life cycle of the battery is not long, and the like.

Patent Document 2 discloses a beads mill as a wet grinding device which forms an alloy from a mixture of Si powder and transition metal by a mechanical alloying method, and grinds the alloy into particles having an average particle diameter ($D_{50}$) of 0.50 to 20 μm. Patent Document 2 also discloses that it is possible to use a non-protic solvent such as hexane, acetone, and n-butyl acetate, and a protic solvent such as water, methyl alcohol, ethyl alcohol, 1-propyl alcohol, 2-propyl alcohol, 1-butyl alcohol, and 2-butyl alcohol as a dispersion medium used in the wet grinding. However, Patent Document 2 does not disclose a method of grinding the silicon powder into particles having an average particle diameter ($D_{50}$) of less than 0.5 µm.

Patent Documents 3, 4, and 5 disclose that a Si—Sn—Cu alloy powder is ground into particles having an average particle diameter of up to 0.28 µm by using a beads mill grinding using zirconia beads as beads and isopropyl alcohol as a medium. However, there are problems in that due to pulverization, contact resistance between particles is increased, and charging/discharging efficiency deteriorates, and characteristics expected by using particulates have not been exhibited. Furthermore, as an attempt to increase the electrochemical reaction efficiency by increasing conductivity even in the negative electrode, an attempt to increase the conductivity by adding carbon nanotube and carbon nanofiber in small amounts has also been conducted, but carbon nanotube and carbon nanofiber aggregate with each other, so that it is difficult to efficiently disperse carbon nanotube and carbon nanofiber, the coasts are high, and it is difficult to increase the content of carbon nanotube and carbon nanofiber in the negative electrode.

CITATION LIST

Patent Document (Patent Document 1) 1. Official gazette of Japanese Patent Application Laid-Open No. 2008-112710
(Patent Document 2) 2. Official gazette of International Publication No. WO2006/129415
(Patent Document 3) 3. U.S. Pat. No. 7,141,187
(Patent Document 4) 4. U.S. Pat. No. 7,316,792
(Patent Document 5) 5. U.S. Pat. No. 7,803,290

DISCLOSURE

Technical Problem

The present invention has been made in an effort to provide a method for manufacturing a silicon material which may electrochemically store and release a large amount of lithium as a negative electrode active material for a power storage device, which has high energy density.

In particular, the present invention has been made in an effort to provide a method for manufacturing a slurry in which silicon particles for manufacturing a slurry for forming an electrode layer, which suppresses a surface oxidation film of silicon particles from being produced and silicon particles from aggregating, are dispersed in a method for manufacturing an electrode structure for a negative electrode of a power storage device, such as a lithium secondary battery having an active material layer composed of a composite of silicon particles and carbon (a secondary battery using oxidation and reduction reactions of lithium ions). The power storage device herein includes a capacitor, a secondary battery, a device which combines a capacitor with a secondary battery, and a device to which a power generation function is also imparted.

Technical Solution

A first exemplary embodiment of the present invention may be a negative electrode active material for a secondary battery, including a silicon particle and an amorphous surface layer formed on the surface of the silicon particle, in which the material is manufactured by manufacturing a slurry including the silicon particle through a dry grinding and a wet grinding, and then mixing and dispersing a material which forms the amorphous surface layer in the slurry.

A secondary exemplary embodiment of the present invention may be a negative electrode active material for a secondary battery, including a silicon particle, a carbon particle with a graphene structure, and a silicon-carbon composite including fibrous carbon and carbon black, in which the silicon particle is in contact with one or more selected from the group consisting of a carbon particle with a graphene structure, fibrous carbon, and carbon black.

A third exemplary embodiment of the present invention may be a method for manufacturing a negative electrode active material, the method including: a dry grinding process of performing a dry grinding on a starting material under an inert atmosphere to prepare a dry ground product, and a wet grinding and dispersing process of performing a wet grinding on the dry ground product and dispersing the dry ground product to manufacture a slurry.

A fourth exemplary embodiment of the present invention may be a conductive composition for a secondary battery, in which carbon is dispersed in a non-protic solvent having no proton donor ability.

A fifth exemplary embodiment of the present invention may be a method for manufacturing a conductive composition for a secondary battery, the method including: a process of mixing an additive with a non-protic solvent to prepare a solution; and a dispersing process of adding a carbon material to the solution to disperse the material. The dispersing process may be performed by a beads mill.

A sixth exemplary embodiment of the present invention may be a negative electrode material for a secondary battery, including a solvent, a negative electrode active material, the conductive composition of the third exemplary embodiment, and a binder, in which the negative electrode active material includes one or more selected from the group consisting of the negative electrode active material of the first exemplary embodiment and the negative electrode active material of the second exemplary embodiment.

A seventh exemplary embodiment of the present invention may be a method for manufacturing a negative electrode material for a secondary battery, the method including: preparing a negative electrode active material according to the third exemplary embodiment; preparing a conductive composition according to the fifth exemplary embodiment; and manufacturing a slurry by mixing the negative electrode active material, the conductive composition and a binder with a solvent, in which the negative electrode active material includes one or more selected from the group consisting of the negative electrode active material of claim 1 and the negative electrode active material of claim 7.

An eighth exemplary embodiment of the present invention may be a negative electrode structure including a conductive metal and a negative electrode material layer formed on the conductive metal, in which the negative electrode material layer includes the negative electrode material of the sixth exemplary embodiment, and the conductive metal may include one or more selected from the group consisting of copper and aluminum.

A ninth exemplary embodiment of the present invention may be a method for manufacturing a negative electrode structure, the method including: preparing a negative electrode material according to the seventh exemplary embodiment; applying the prepared negative electrode material on a conductive metal; and subjecting the applied negative electrode material to heat treatment.

A tenth exemplary embodiment of the present invention may be a secondary battery including: the negative electrode structure of the eighth exemplary embodiment; a separator; a positive electrode structure; and a current collector.

An eleventh exemplary embodiment of the present invention may be a method for manufacturing a secondary battery, the method including: preparing a negative electrode structure according to the ninth exemplary embodiment; and stacking the prepared negative electrode structure, a separator, and a positive electrode structure.

Advantageous Effects

According to the present invention, since the negative electrode active material manufactured using a slurry in which a silicon particle is dispersed is formed of a composite of a silicon particle and carbon or a lithium ion solid electrolyte, and silicon particles are suppressed from aggregating due to a low content of oxygen in silicon particles, a power storage device such as a lithium secondary battery may have performances of high energy density, high output density and a longer charging/discharging life cycle by using the negative electrode active material in a negative electrode.

Further, the method for manufacturing a negative electrode active material according to the present invention is excellent in mass production that the negative electrode active material may be inexpensively manufactured. In addition, the electronic conductivity of a secondary battery negative electrode may be enhanced by adding the conductive composition according to the present invention during the manufacture of the negative electrode, and accordingly, performance of the battery may be enhanced.

BEST MODE

Figure 1:
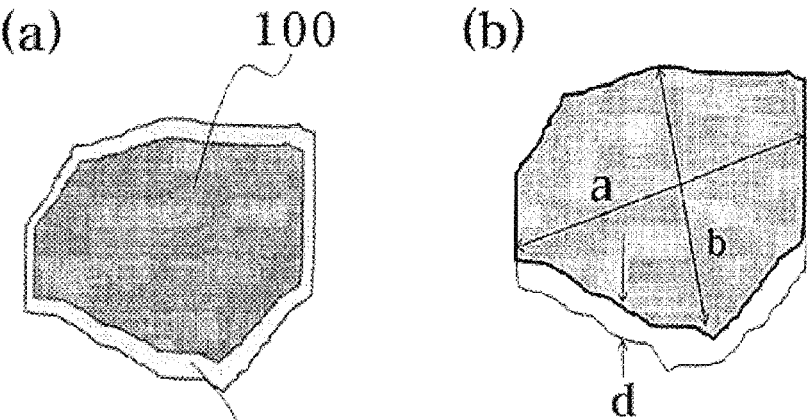
FIG. 1 is schematic views (a) and (b) of a silicon particle included in a negative electrode active material according to an exemplary embodiment of the present invention, a SEM photograph (c) of the silicon particles, and TEM photographs (d) of the silicon particles.
Figure 1:
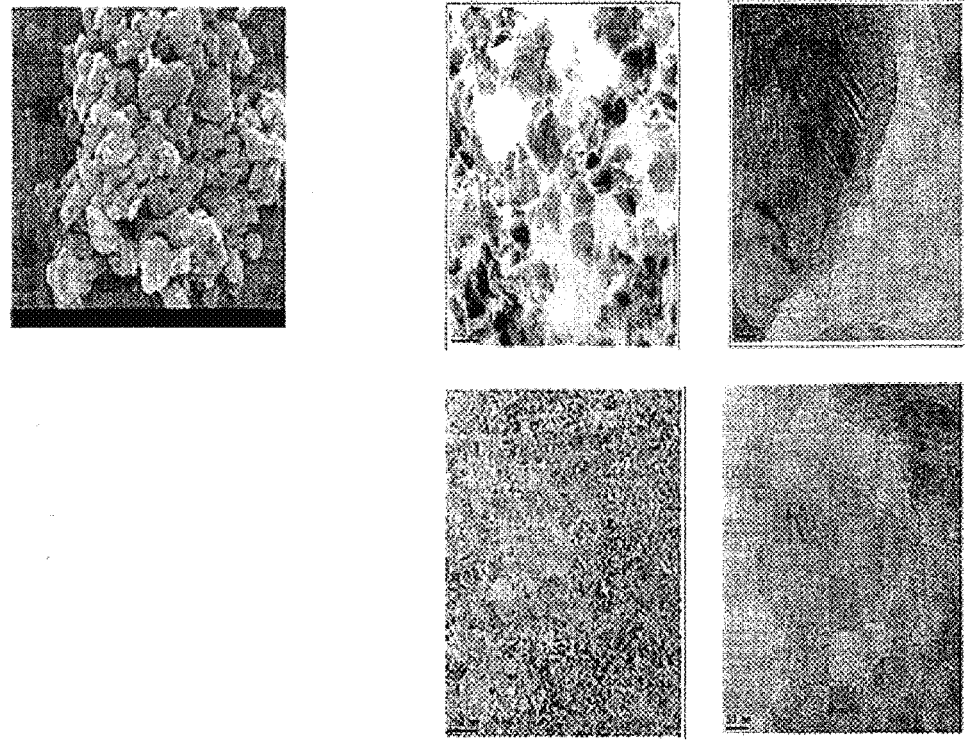

Hereinafter, preferred exemplary embodiments of the present invention will be described with reference to the accompanying drawings. Exemplary embodiments of the present invention may be modified in various forms, and the scope of the present invention is not limited to the exemplary embodiments to be described below. Further, exemplary embodiments of the present invention are provided so as to more completely describe the present invention to the person skilled in the art. Accordingly, the shape, the size and the like of elements illustrated in the drawings may be exaggerated for a more clear description, and elements represented by the same reference numerals in the drawings are the same elements.

Figure 2:
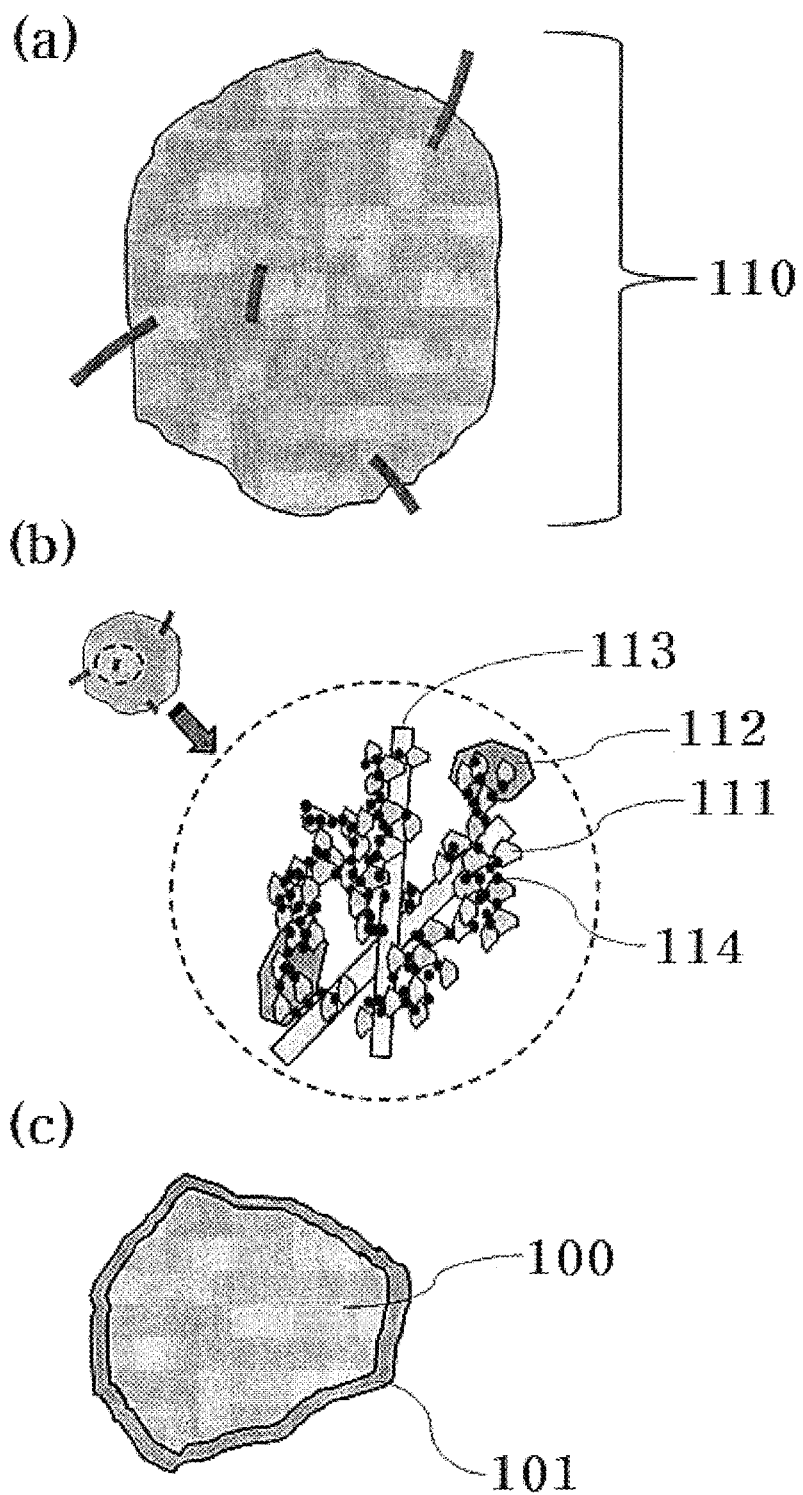
FIG. 2 is schematic views of a silicon-carbon composite included in the negative electrode active material according to an exemplary embodiment of the present invention.
Figure 3:
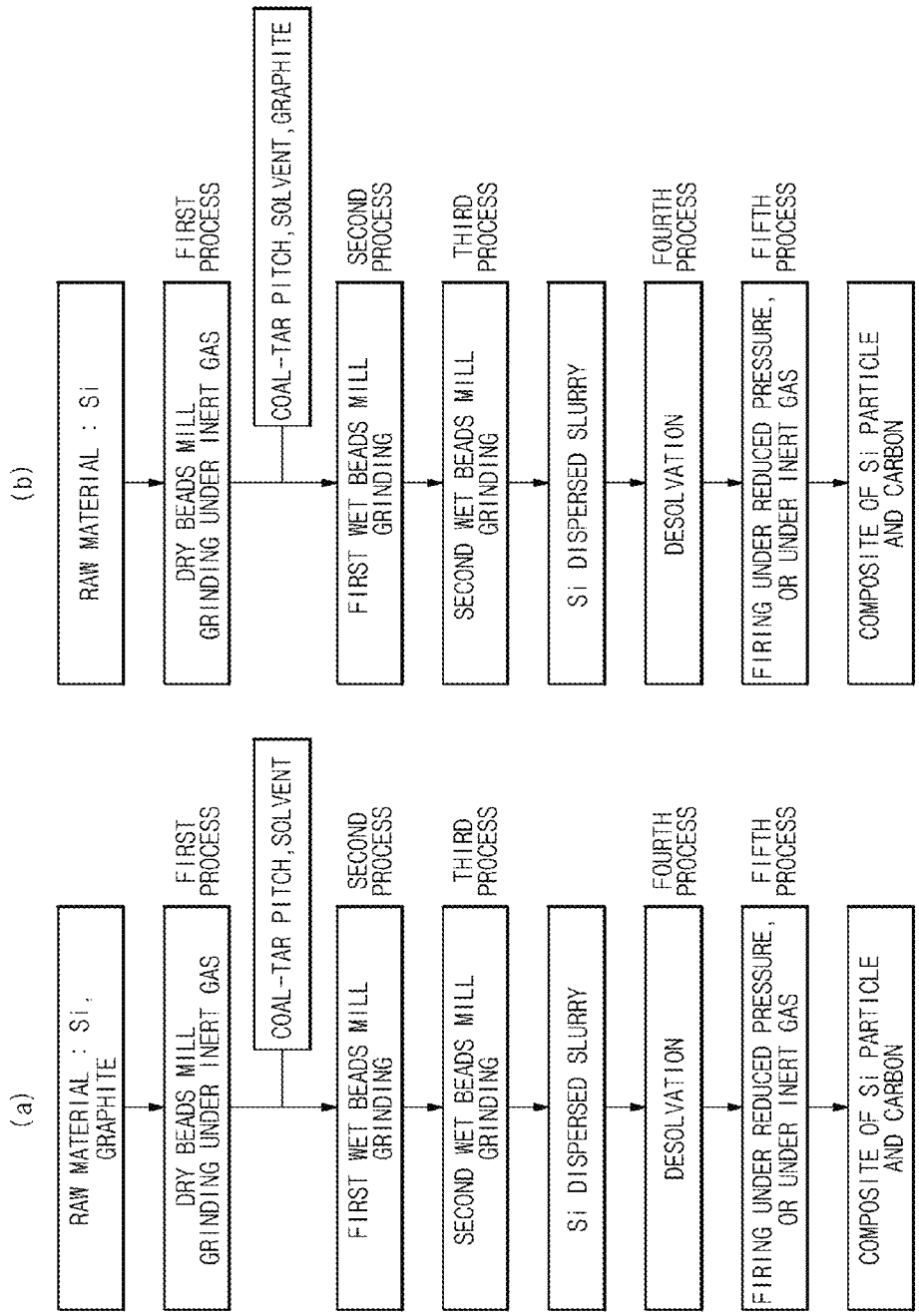
FIG. 3 is a flowchart illustrating a process of manufacturing a negative electrode active material according to an exemplary embodiment of the present invention.
Figure 4:
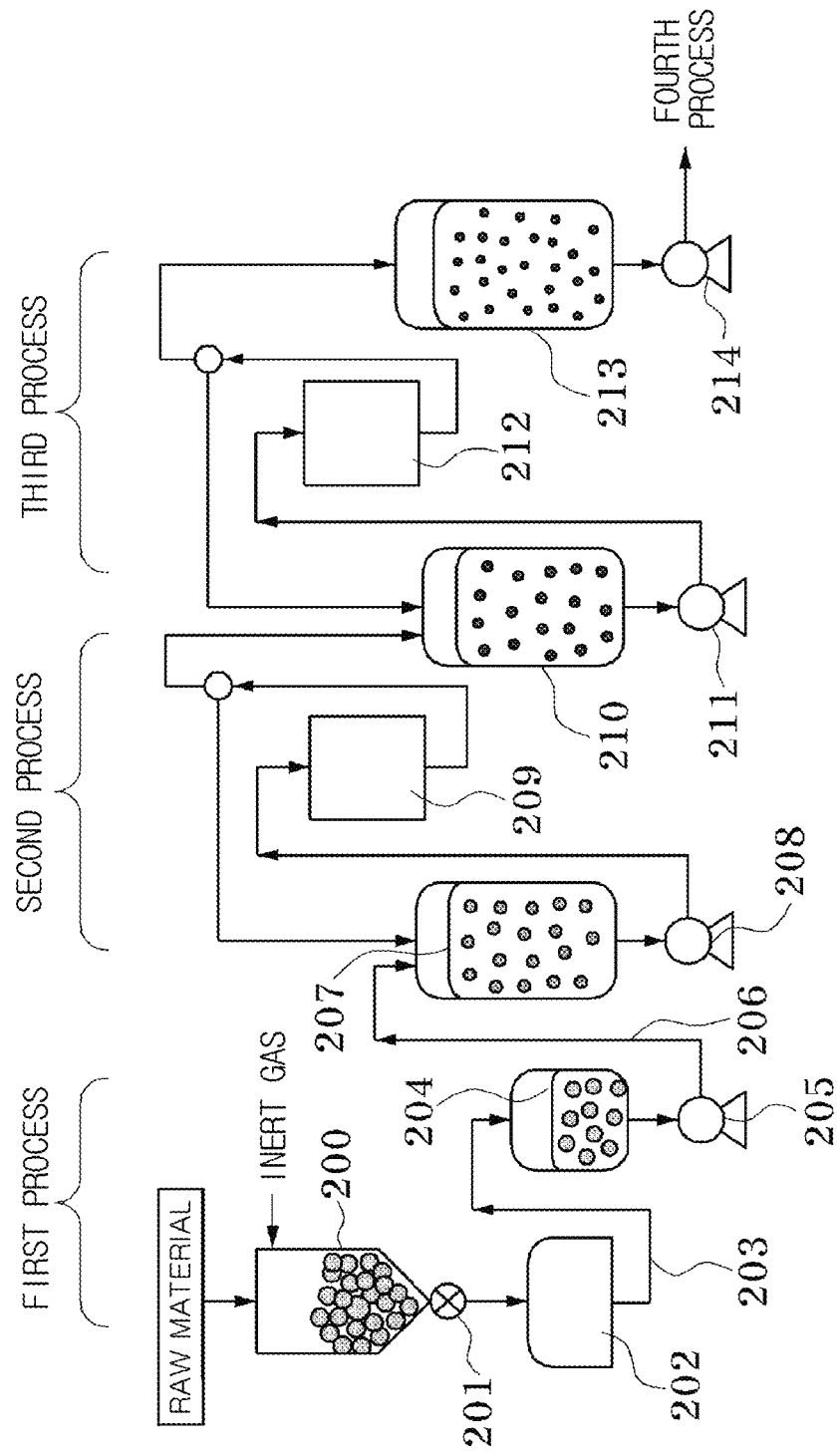
FIG. 4 is a schematic view illustrating a device system used in the manufacture of a negative electrode active material according to an exemplary embodiment of the present invention.
Figure 5:
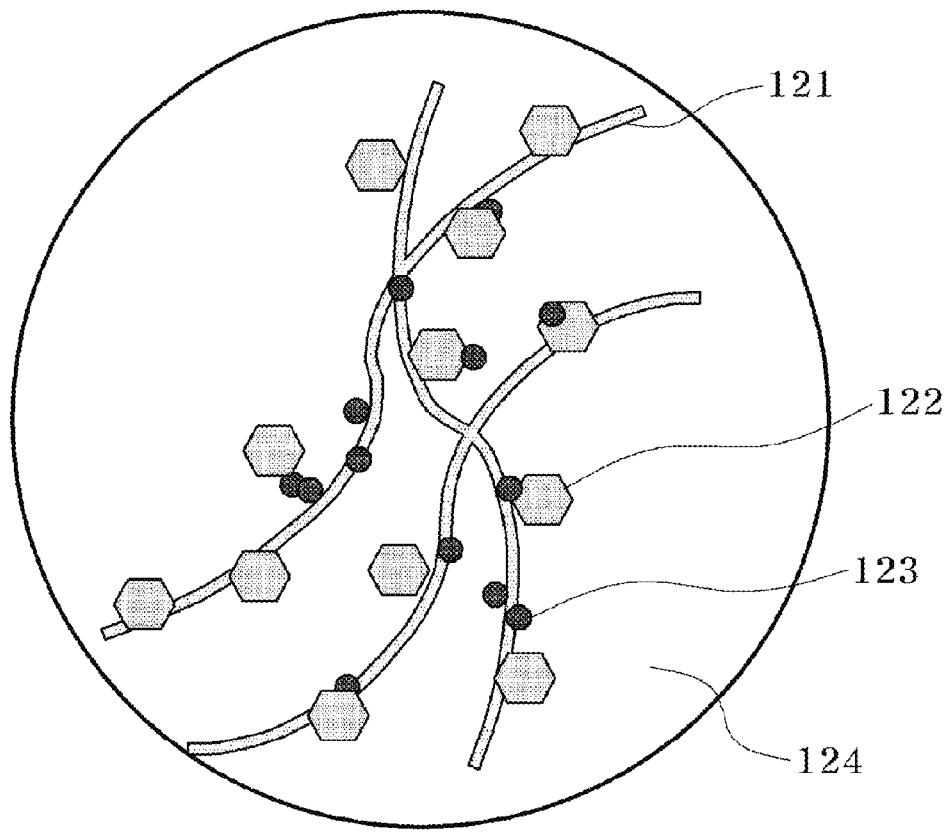
FIG. 5 is a schematic view of a conductive composition for a secondary battery according to an exemplary embodiment of the present invention.
Figure 6:
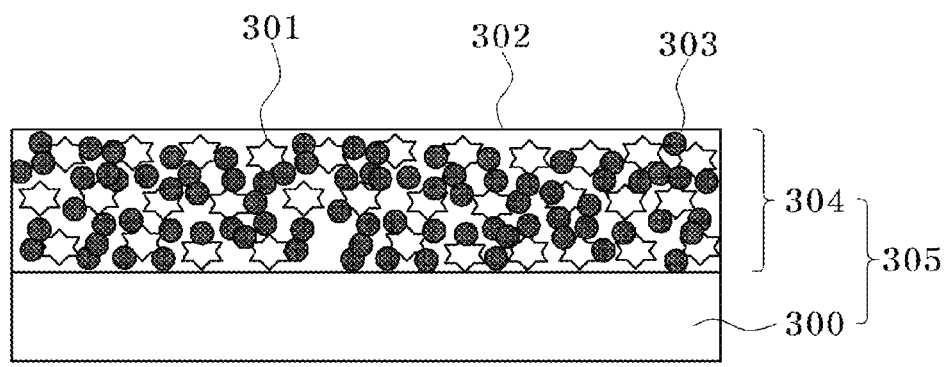
FIG. 6 is a cross-sectional view of a negative electrode structure manufactured according to an exemplary embodiment of the present invention.
Figure 7:
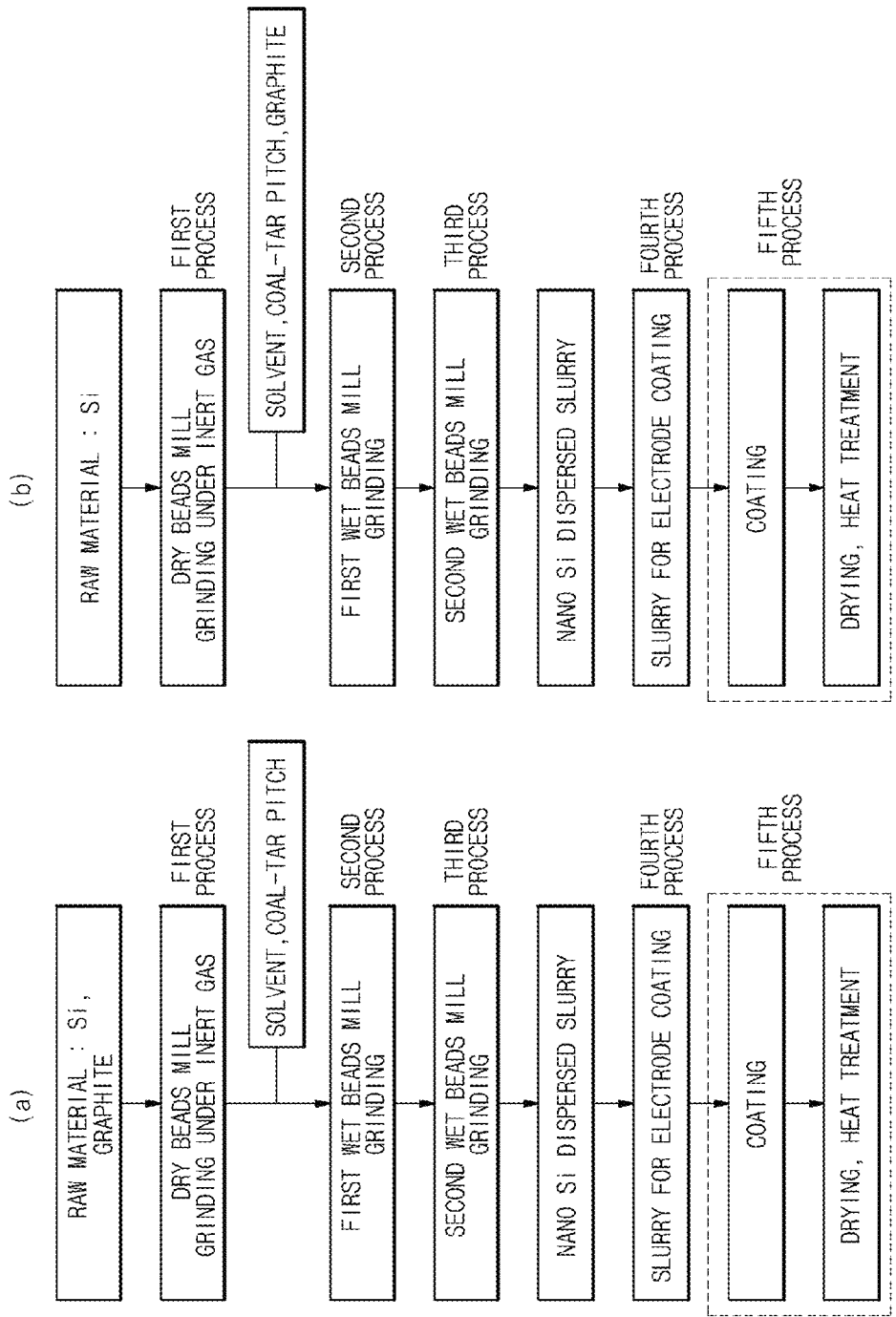
FIG. 7 is a flowchart illustrating a process of manufacturing a negative electrode structure manufactured according to an exemplary embodiment of the present invention.
Figure 8:
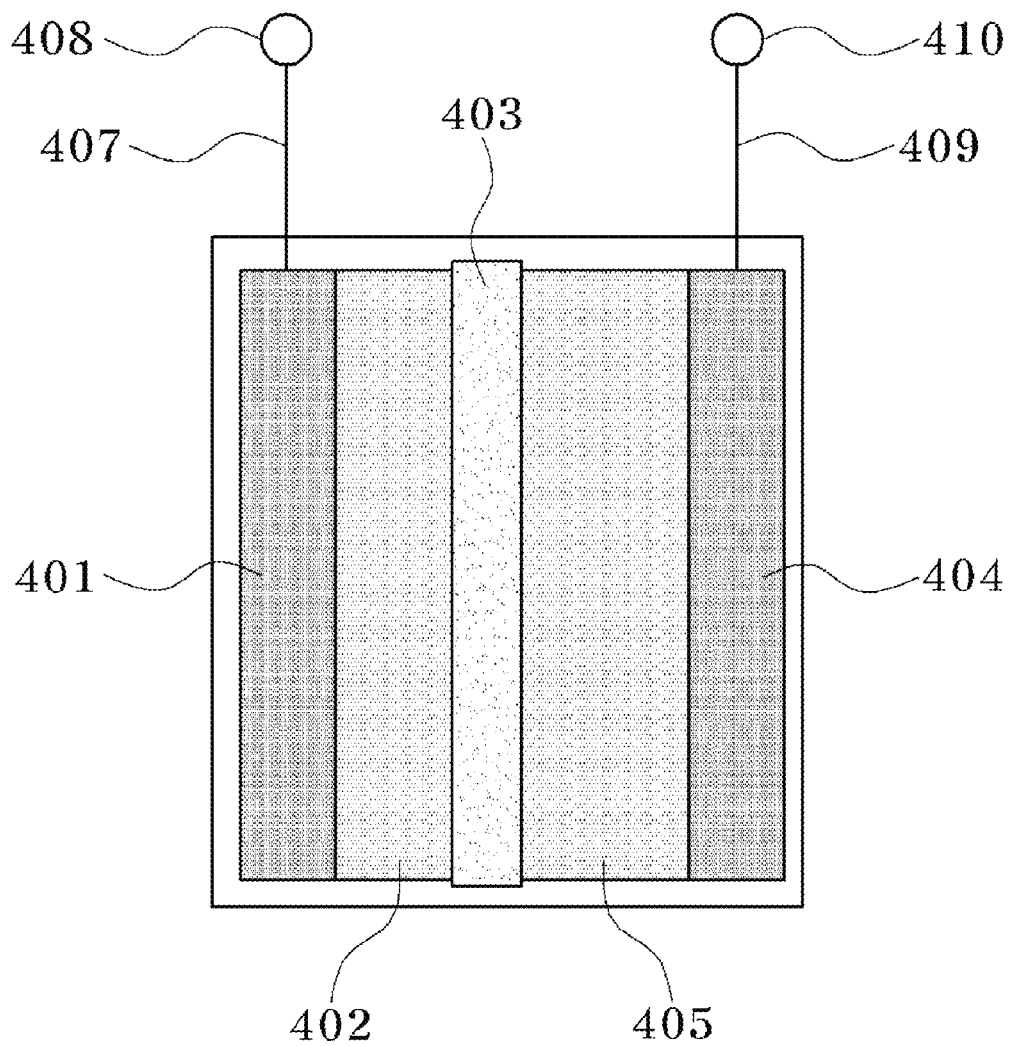
FIG. 8 is a schematic cross-sectional view of a power storage device manufactured according to an exemplary embodiment of the present invention.
Figure 9:
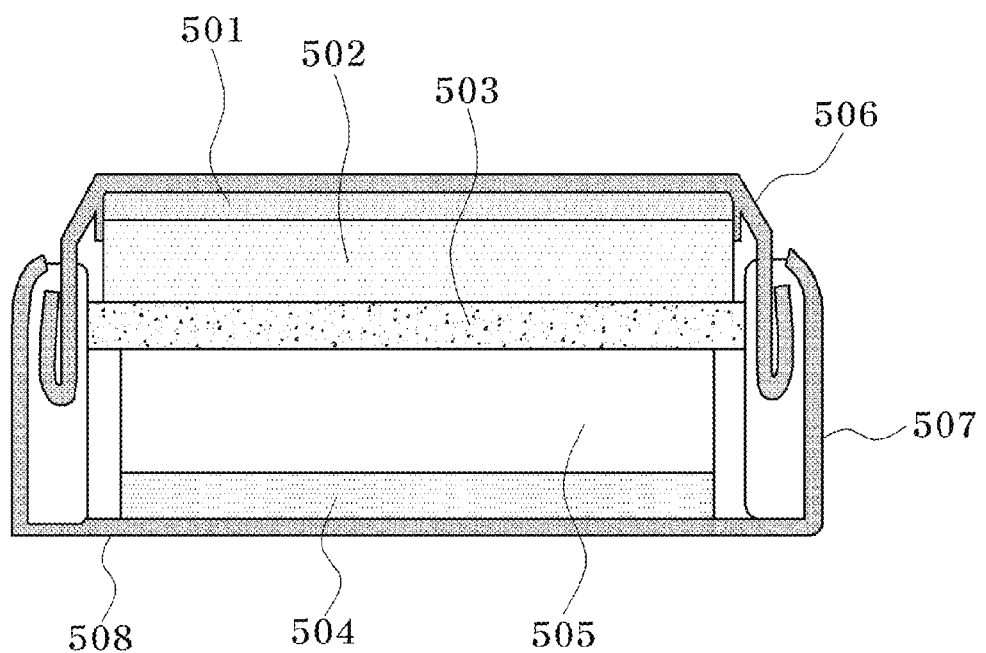
FIGS. 9 to 11 are schematic views of a coin-type cell, a laminate cell, and a cylinder-type cell, which are examples of a power storage device manufactured according to an exemplary embodiment of the present invention.
Figure 10:
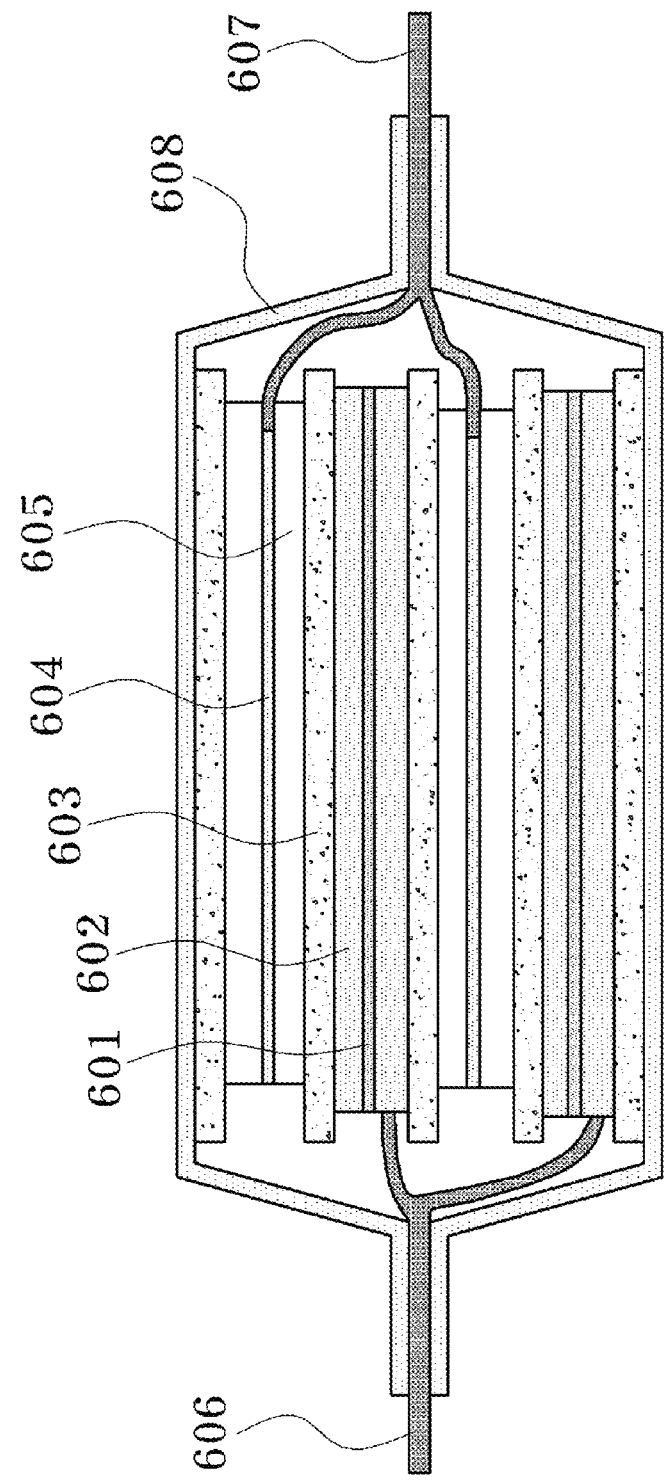
Figure 11:
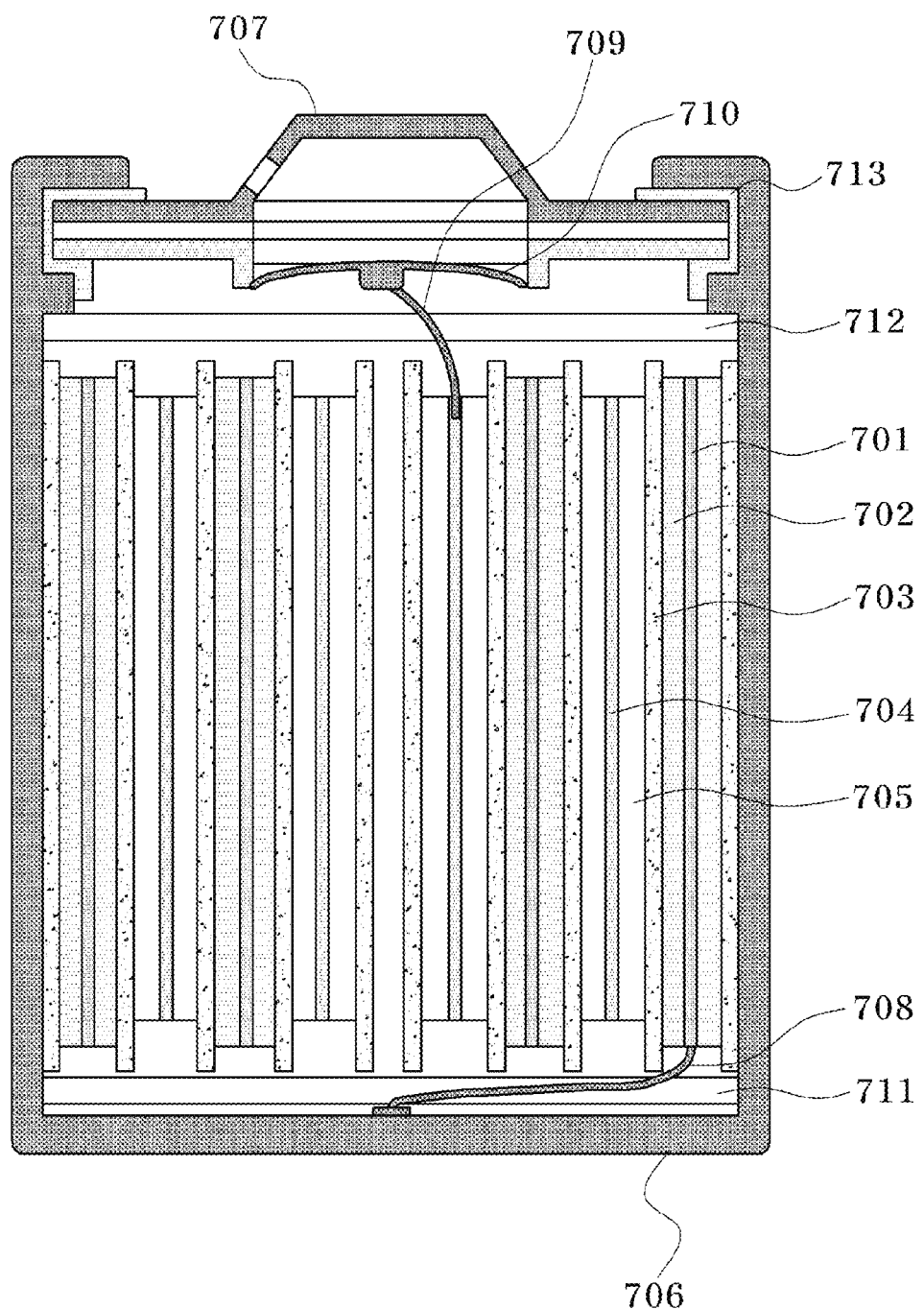

FIG. 1 is schematic views (a) and (b) of a silicon particle included in a negative electrode active material according to an exemplary embodiment of the present invention, a SEM photograph (c) of the silicon particles, and TEM photographs (d) of the silicon particles. FIG. 2 is schematic views of a silicon-carbon composite included in the negative electrode active material according to an exemplary embodiment of the present invention. FIG. 3 is a flowchart illustrating a process of manufacturing a negative electrode active material according to an exemplary embodiment of the present invention. FIG. 4 is a schematic view illustrating a device system used in a process of manufacturing a negative electrode active material according to an exemplary embodiment of the present invention. FIG. 5 is a schematic view of a conductive composition for a secondary battery according to an exemplary embodiment of the present invention. FIG. 6 is a cross-sectional view of a negative electrode structure manufactured according to an exemplary embodiment of the present invention. FIG. 7 is a flowchart illustrating a process of manufacturing a negative electrode structure manufactured according to an exemplary embodiment of the present invention. FIG. 8 is a schematic cross-sectional view of a power storage device manufactured according to an exemplary embodiment of the present invention. FIGS. 9 to 11 are schematic views of a coin-type cell, a laminate cell, and a cylinder-type cell, which are examples of a power storage device manufactured according to an exemplary embodiment of the present invention.

Referring to FIG. 1, a first exemplary embodiment of the present invention may be a negative electrode active material including a silicon particle 100 and an amorphous surface layer 101 formed on the surface of the silicon particle 100.

The silicon particle 100 may be a powder obtained by grinding a silicon element bulk material, and the average particle diameter of the silicon particle 100 may be 5 to 200 nm. When the average particle diameter of the silicon particle 100 is less than 5 nm, the size of the oxidation surface area is increased, so that the performance as a negative electrode active material may be lower than a designed value, and when the average particle diameter thereof is larger than 200 nm, an pulverized surface with respect to a change in volume accompanied by charging/discharging may steadily occur, thereby leading to deterioration in service life characteristics.

The amorphous surface layer 101 may be formed on the surface of the silicon particle 100, and the amorphous surface layer 101 may include amorphous carbon.

Since the silicon particle 100 is blocked from being in direct contact with the outside by the amorphous surface layer 101 formed on the surface of the silicon particle 100, the surface of the silicon particle 100 may be suppressed from being oxidized. In contrast, the surface layer 101 includes carbon, and thus may be used as a carbon precursor for carbonization or graphitization, which may contribute to electronic conductivity of the negative electrode. In conclusion, by preventing the surface of the silicon particle 100 from being oxidized, and forming the surface layer 101 including carbon thereon, the electronic conductivity of the negative electrode may be enhanced through carbonization or graphitization of the carbon precursor through firing.

The thickness of the amorphous surface layer 101 may be 1 to 10 nm. When the thickness of the amorphous surface layer 101 is less than 1 nm, the surface layer 101 is so thin that it is too thin to prevent the silicon particle 100 from being oxidized, and when the thickness is more than 10 nm, lithium ions may be inhibited from being inserted into the active material.

The primary particle has a long diameter (a)>a small diameter (b)>a thickness (d), the long diameter may be 50 to 300 nm, the small diameter 30 to 200 nm, and the thickness may be 10 to 50 nm.

Further, FIG. 1 illustrates a scanning electron microscope photograph (c) of silicon particles coated with amorphous carbon and transmission electron microscope photographs (d) thereof. FIG. 1(c) is a SEM photograph of silicon particles milled by zirconia beads having a diameter of 0.1 mm. The two upper photographs of FIG. 1(d) are TEM photographs of silicon particles milled by zirconia beads having a diameter of 0.2 mm, and the two lower photographs are TEM photographs of silicon particles milled by zirconia beads having a diameter of 0.03 mm. According to the photographs, it can be confirmed that the amorphous carbon layer 101 is formed on the surface of the silicon particle 100.

Referring to FIGS. 2(a) and 2(b), the second exemplary embodiment of the present invention is a negative electrode active material including a silicon-carbon composite 110 including one or more selected from the group consisting of a silicon particle 111, a carbon particle 112 with a graphene structure, fibrous carbon 113, and carbon black 114, and the silicon particle 111 may be a negative electrode active material which is in contact with one or more selected from the group consisting of the carbon particle 112 with a graphene structure, the fibrous carbon 113, and the carbon black 114.

In the present exemplary embodiment, it may be understood that carbon is complexed with the silicon particle 111 which is a main material of the negative electrode active material in various forms. That is, various forms of carbon, that is, the carbon particle 112 with a graphene structure, the fibrous carbon 113, and the bead-like carbon black 114 are complexed with the silicon particle 111. A complex effect may be maximized by complexing various forms of carbon with the silicon particle.

Referring to FIG. 2(c), the silicon particle 100 may be a powder obtained by grinding silicon, and the average particle diameter of the silicon particle 100 may be 5 to 200 nm. The amorphous surface layer 101 may be formed on the surface of the silicon particle 100, the amorphous surface layer 101 may include an amorphous carbon layer, and the thickness of the amorphous surface layer 101 may be 1 to 10 nm.

The description of the silicon particle 100 and the surface layer 101 thereof is the same as that of the first exemplary embodiment.

The carbon particle 112 with a graphene structure may mean a particle in which a carbon particle has a graphene structure. The carbon particle 112 with a graphene structure may include one or more selected from the group consisting of graphene and graphite. The average particle diameter of the carbon particle 112 with a graphene structure may be 300 nm to 10 um.

The average diameter of the fibrous carbon 113 may be 10 to 200 nm. The fibrous carbon particle 113 may include one or more selected from the group consisting of carbon nanofiber and carbon nanotube.

The carbon black 114 has a primary particle having a bead-like connected structure, the average particle diameter of the primary particle may be 10 to 80 nm, and the crystal size of the primary particle may be 2 to 5 nm. The average particle diameter of the silicon-carbon composite 110 may be 5 to 20 um.

The silicon particle 111 may be in contact with one or more selected from the group consisting of the carbon particle 112 with a graphene structure, the fibrous carbon 113 and the carbon black 114. Since carbon such as the carbon particle 112 with a graphene structure, the fibrous carbon 113, and the carbon black 114 are electronically conductive, electronic conductivity between silicon particle and silicon particle may be enhanced due to the presence of one or more of those carbons, which are in contact with the silicon particle 111, thereby enhancing the performance of the battery.

The silicon-carbon composite 110 may further include a lithium ion solid electrolyte particle in addition to the various carbons, and the silicon particle may be in contact with the lithium ion solid electrolyte particle. In this case, transition of lithium ions may easily occur on the surface of the silicon particle when a power storage device is operated.

A lithium ion inorganic solid electrolyte may include a sulfur-based amorphous electrolyte represented by $Li_2S$—$P_2O_5$, a sulfur-containing glass, lithium nitride ($Li_3N$), a material with a NASICON crystal structure represented by $Li_{1+x+y}Al_xTi_{2-x}Si_yP_{3-y}O_{12}$ (x=0.3, y=0.2), a material with a garnet structure represented by $Li_7La_3Zr_2O_{12}$, and a germanium-phosphorus-sulfur compound represented by $Li_{10}GeP_2S_{12}$.

Referring to FIGS. 3 and 4, the third exemplary embodiment of the present invention may be a method for manufacturing a negative electrode active material, the method including: a dry grinding process of performing a dry grinding on a starting material under an inert atmosphere to prepare a dry ground product, and a wet grinding and dispersing process of performing a wet grinding on the dry ground product and dispersing the dry ground product to manufacture a slurry. At least one of the dry grinding process and the wet grinding and dispersing process may be performed by a beads mill process. For the coherence of the process, it is preferred that all the processes are performed by the beads mill process.

First, a dry grinding may be performed on a starting material under an inert atmosphere to prepare a ground product (a dry grinding process, a first process). The starting material is not particularly limited as long as the material may be used as a negative electrode material. The starting material may include a silicon powder, and may also include another material in addition to silicon. Coal-tar pitch is adopted as an example of the additive, and graphite is adopted as an example of the added material, but the present invention is no limited thereto. FIG. 3(a) illustrates the case where the added material graphite is mixed with the starting material silicon. FIG. 3(b) illustrates the case where only the silicon powder is used as the starting material, and the added material graphite is added after the dry grinding and before the wet grinding.

The average particle diameter of the starting material silicon powder may be several mm or less. When the average particle diameter thereof is larger than this value, time needed for the grinding may be prolonged, thereby leading to a drop in productivity. The average particle diameter of the silicon particle obtained in the first process is preferably several µm or less, more preferably in a range of 1 to 10 µm. In this process, a beads mill is used as the dry grinding device, but other media mills such as a jet mill or a vibrating mill may be used.

The starting material may be prevented from being oxidized by performing a dry grinding on the starting material under an inert atmosphere. Since heat at high temperature may be generated in the dry grinding process, the particle to be ground may be easily oxidized when the particle is in contact with oxygen in the air, and the dry grinding may be performed under an inert atmosphere to block the starting material to be ground from being in contact with oxygen, thereby preventing the starting material from being oxidized. The inert atmosphere may be, but is not limited to, a nitrogen gas atmosphere, or an argon gas atmosphere.

When silicon is used as the starting material, the surface of the silicon particle may be prevented from being oxidized. This is because when the surface of the silicon particle is oxidized, the oxidation layer is electrically insulated, and accordingly, electronic conductivity of the negative electrode manufactured by using the oxidation layer deteriorates, and as a result, the performances of the negative electrode and the power storage device may deteriorate.

Next, the dry ground product may be mixed with a solvent in which the additive is dissolved, and may be ground and dispersed with a wet beads mill to prepare a slurry (a wet grinding and dispersing process, a second process, and a third process). When the primary particle of the starting material is less than 1 µm, the dry grinding process (the first process) may be omitted, and the wet grinding process (the second process) may be initially performed. In FIG. 3, the wet grinding process is performed in two steps of the second process and the third process, but may also be performed in a multi-step process composed of three or more steps. This is because it is preferred to grind silicon particles into a desired size by gradually decreasing the size of the beads and grinding the silicon particles in a multi-step process composed of two or more steps. Specifically, the silicon ground in the dry grinding process (the first process) may be mixed with a solution in which the additive coal-tar pitch is dissolved in a non-protic solvent and be ground for a predetermined time by using a first wet beads mill in the second process, and subsequently, may be further ground by a wet beads mill using beads with a smaller size in the third process, thereby obtaining a slurry in which the silicon particles are dispersed.

The dry ground starting material needs to be transported to a wet grinding process while not being in contact with oxygen. This is for preventing the surface of the dry ground starting material under an inert atmosphere from being oxidized.

By appropriately selecting a solvent which is a medium used in the wet grinding, the surface of silicon may be suppressed from being oxidized during the grinding, and silicon particles may also be suppressed from aggregating. Furthermore, by selecting an additive and an added material which are easily dissolved in the solvent and do not adversely affect the performance of a power storage device even though the additive and the added material remain during the firing, the ground silicon particles may be suppressed from re-aggregating. It is possible to use a solvent having no proton donor ability (a non-protic solvent) and a solvent having proton donor ability (a protic solvent) as the solvent used in the second and third processes, but it is more preferred to use the non-protic solvent because in the case of using a non-protic solvent, it is more difficult for the surface of silicon to be oxidized during the grinding.

Examples of the non-protic solvent include one or more selected from the group consisting of a cyclic hydrocarbon, an aromatic compound, a ketone-based solvent, an ether-based solvent, an amide-based solvent, and a nitrile-based solvent, and among them, a cyclic hydrocarbon, an aromatic compound, and a ketone-based solvent are most preferred. The most preferred specific examples of the non-protic solvent include N-methyl-2-pyrrolidone, γ-butyrolactone, N,N-dimethylacetamide, 1,3-dimethyl-2-imidazolidine, and cyclohexane. The additive is not particularly limited as long as the additive is a material which is soluble or easily dispersed in a medium used in the wet grinding and cracking, and is easily carbonized during the firing process under an inert atmosphere. In FIG. 3, the additive coal-tar pitch is added before the second process, but may be added before the first process, before the third process, or before the fourth process. Instead of coal-tar pitch, petroleum pitch or a polycyclic aromatic hydrocarbon may also be used. Coal-tar pitch and petroleum pitch are inexpensive, and thus are most preferred. An example of the polycyclic aromatic hydrocarbon corresponds to naphthalene, anthracene, phenanthrene, naphthacene, pyrene, triphenylene, chrysene, pentacene, benzopyrene, corannulene, coronene, ovalene, and the like. The amount of additive added is preferably in a range of 0.05 to 5 parts by weight, more preferably in a range of 0.2 to 3 parts by weight, and most preferably in a range of 0.5 to 2 parts by weight, based on 100 parts by weight of silicon. The additive has an effect that the additive is dissolved in a non-protic solvent to generate a newly ground surface of silicon, and simultaneously the surface is covered with the solution to suppress the aggregation through electrostatic repulsion or hydrophobic repulsion.

When the protic solvent is used as a solvent of the wet beads mill, there is an advantage in that problems such as environmental contamination are minimal. As the protic solvent, water and alcohol are preferred, and as the additive used in this case, it is preferred to use a polyvinyl pyrrolidone having a ketone or ether structure, or one or more polymers of a carboxymethylcellulose sodium salt and a group of polyvinyl alcohols. The amount of additive added is preferably in a range of 0.05 to 5 parts by weight, more preferably in a range of 0.1 to 3 parts by weight, and most preferably in a range of 0.5 to 2 parts by weight, based on 100 parts by weight of the solvent. When silicon is ground in the solvent in which the additive is dissolved, silicon may be more easily bonded to adjacent atoms due to the unsaturated bond (dangling bond) of the silicon atom, which is formed on the surface of the ground silicon particle, and accordingly, (1) it is possible to prevent ground silicon particles from re-aggregating and uniformly disperse ground silicon particles, (2) it is possible to suppress an oxidation film from being formed on the surface of silicon particle, and (3) it is possible to enhance the dispersion of silicon particles in the silicon particle-carbon composite, and form the interface of silicon with a carbon material well. Further, the simultaneously ground added material may also maintain a more stable dispersion state than the solvent in which the additive is dissolved. Accordingly, in the third process, it is possible to obtain silicon and a slurry which is more uniformly dispersed than the added material.

The particle diameter of the silicon particle introduced into the wet beads mill in the second process is preferably several μm or less, more preferably in a range of 1 to 10 μm. The wet grinding process may be performed until the average particle diameter of the starting material becomes 3 nm to 200 nm. The average particle diameter of the silicon particle obtained in the third process is preferably in a range of 3 to 200 nm, more preferably in a range of 10 to 200 nm, and most preferably in a range of 20 to 100 nm. When the average particle diameter of the starting material is less than 5 nm, aggregation among the molecules of the starting material may occur, and accordingly, dispersion may not be achieved well in the subsequent dispersion process, and when the diameter thereof is more than 200 nm, the particles of the starting material are too large to achieve dispersity sufficient to be used as a negative electrode active material.

The wet beads mill used in the present invention is preferably a beads mill which enables continuous grinding provided with a circulation tank. A material for the beads used in the beads mill is preferably zirconia, alumina, silicon nitride, and titania. In particular, zirconia or alumina has high grinding capacity due to high hardness, and thus is preferred because zirconia or alumina remains only in a small amount even while being used in the manufacture of an electrode or a battery in the subsequent process, and thus has almost no adverse effect, and the diameter thereof is preferably 2 mm or less, and more preferably in a range of 0.03 to 0.8 mm in the wet beads mill.

The added material may be a material which is not dissolved in a medium used in the wet grinding. When subjected to the dispersing process, the added material is branched, and thus may be present while being uniformly dispersed in the slurry. The added material may include one or more selected from the group consisting of graphite, graphene, carbon nanotube, carbon fiber, amorphous carbon, and a lithium ion inorganic solid electrolyte. Preferably, the added material may be graphite, graphene, carbon nanofiber, carbon nanotube, and an inorganic solid electrolyte of lithium ions. The inorganic solid electrolyte of lithium ions is more preferably a so-called "ceramic electrolyte" such as metal, oxide, carbide, a boron compound, a sulfide, and a phosphoric acid compound, and specific examples of the inorganic solid electrolyte of lithium ions include a sulfur-based amorphous electrolyte represented by $Li_2S$—$P_2O_5$, a sulfur-containing glass, lithium nitride ($Li_3N$), a material with a NASICON crystal structure represented by $Li_{1+x+y}Al_xTi_{2-x}Si_yP_{3-y}O_{12}$ (x=0.3, y=0.2), a material with a garnet structure represented by $Li_7La_3Zr_2O_{12}$, and a germanium-phosphorus-sulfur compound represented by $Li_{10}GeP_2S_{12}$.

In FIG. 3, an added material (for example, graphite) is added before or after the first process, but a slurry of an added material, which is finely ground and dispersed in advance in a separate process, may also be added to the second process to the fourth process. The added material has a surface potential different from that of silicon, and thus may suppress silicon particles from aggregating. Further, particles of the added material may be present while being more uniformly dispersed among silicon particles by adding the added material (graphite) during the grinding of the silicon particles, and when an electrode structure is formed using the same, it is possible to complement electronic conduction among silicon particles, or conduction of lithium ions into silicon particles.

By grinding silicon in a solvent (medium) containing a carbon source (an additive or an added material), ground silicon particles may be suppressed from re-aggregating and an insulating oxidation film may be suppressed from being formed on the surface of silicon particle, and when a negative electrode is manufactured, conductivity may be maintained due to reduction in the oxidation film present among silicon particles, and electronic conductivity among silicon particles, that is, electronic conductivity of the negative electrode may be enhanced through carbonization or graphitization of a carbon source through an additional firing process, and as a result, performance of the battery may be enhanced. Further, when silicon is ground in a solvent including a solid electrolyte, lithium ions may be easily inserted into the surface of silicon particle when a power storage device is operated.

A process of irradiating ultrasonic waves to perform the treatment may also be included in the first to third processes. The ultrasonic treatment has an effect that particles are facilitated to be dispersed in the solvent, and the aggregating particles are re-dispersed. In addition, amorphous carbon may also be produced on the surface of silicon particle by irradiating ultrasonic wave energy on the slurry in which silicon particles are dispersed in a solution of coal-tar pitch, petroleum pitch, and a polycyclic aromatic compound, and carbon-covered silicon particles may be formed.

When the concentration of a solvent in the slurry obtained in the third process is too high, a slurry having an appropriate viscosity may be obtained by adjusting the amount of solvent by a method such as desolvation by pressurization and centrifuge during the fourth process.

Additionally, a firing (calcination) process of obtaining a negative electrode active material by drying and calcining the slurry may be further included, and from this, it is possible to obtain a silicon particle having a surface layer of the amorphous carbon according to the first exemplary embodiment, or a negative electrode active material of the silicon particle-carbon composite according to the second exemplary embodiment (a calcination process). The calcination process may be performed under reduced pressure or under an inert atmosphere. The inert atmosphere may be a nitrogen gas atmosphere or an argon gas atmosphere. When the calcination process is performed under reduced pressure, the organic compound present in the slurry may be more easily decomposed, and thus, may be volatilized. When the calcination is performed under an inert atmosphere, oxidation may be prevented, thereby contributing to the enhancement of electronic conductivity of the negative electrode. The calcination may be performed at a temperature at which all the organic materials in the slurry may be volatilized and removed.

Referring to FIG. 5, the fourth exemplary embodiment of the present invention may be a conductive composition for a secondary battery, in which carbons 121 to 123 are dispersed in a non-protic solvent 124 having no proton donor ability. The conductive composition for a secondary battery according to the present exemplary embodiment may be used as a conductive auxiliary agent which may complement electronic conductivity of the negative electrode. The conductive auxiliary agent is present on the surface of particle of the negative electrode active material, and thus connects the negative electrode active material to the negative electrode active material, and accordingly, electronic conductivity among the negative active materials is increased by the conductive auxiliary agent, and as a result, the conductive auxiliary agent may contribute to enhancing performance of the negative electrode. Here, the description is made with reference to the negative electrode, but is not limited to the negative electrode, and may also be applied to the positive electrode in some cases.

The non-protic solvent may include one or more selected from the group consisting of a hydrocarbon, an aromatic compound, a ketone-based solvent, an ether-based solvent, an ester-based solvent, an amide-based solvent, and a nitrile-based solvent. The non-protic solvent means a solvent having no proton donor ability, and when a non-protic solvent is used, a material to be ground or dispersed may be more efficiently suppressed from being oxidized.

One or more additives selected from the group consisting of coal-tar pitch and a polycyclic aromatic compound may be added to the non-protic solvent. The additive is not particularly limited as long as the additive is a material which may be easily carbonized under an inert atmosphere. The additive may be carbonized, and thus may also contribute to enhancing electronic conductivity of the negative electrode.

Carbon may be added in order to enhance electronic conductivity of the negative electrode. However, the additive need not be limited to carbon, and is not particularly limited as long as the additive is a material which is excellent in electronic conductivity. The carbon may include one or more selected from the group consisting of fibrous carbon 121, a carbon particle 122 with a graphene structure, and carbon black 123. The carbon may be present in various forms, and thus is not limited to the listed materials, and may also include other forms of carbon.

The fibrous carbon 121 has an average diameter of 10 to 200 nm, the particle 122 with a graphene structure has an average particle diameter of 10 to 200 nm, and the carbon black 123 has an average particle diameter of 10 to 80 nm, has a structure in which a plurality of primary particles is connected in a bead-like shape, and may have a crystal particle size of 2 to 5 nm.

The content of carbon may be 0.05 to 1 g/L. When the content of carbon is less than 0.05 g/L, contribution to electronic conductivity is so low that an effect of enhancing the electronic conductivity of the negative electrode is minimal, and when the content thereof is more than 1.0 g/L, the content of carbon is so high that the fraction of the negative electrode active material in the entire negative electrode is low, and accordingly, the function as a negative electrode active material may deteriorate.

Instead of the non-protic solvent, a protic solvent having proton donor ability may be used. In this case, the protic solvent may include one or more selected from the group consisting of water and alcohol, and one or more additives selected from the group consisting of polyvinyl pyrrolidone, a carboxymethylcellulose sodium salt, and sodium cholate may be added to the protic solvent.

The fifth exemplary embodiment of the present invention may be a method for manufacturing a conductive composition for a secondary battery, the method including: a process of mixing an additive with a non-protic solvent to prepare a solution; and a dispersing process of adding carbon to the solution to disperse the material.

The dispersing process may be performed by a beads mill.

The non-protic solvent may include one or more selected from the group consisting of a hydrocarbon, an aromatic compound, a ketone-based solvent, an ether-based solvent, an ester-based solvent, an amide-based solvent, and a nitrile-based solvent, and one or more additives selected from the group consisting of coal-tar pitch and a polycyclic aromatic compound may be added to the non-protic solvent.

The carbon may include one or more selected from the group consisting of fibrous carbon, a carbon particle with a graphene structure, and carbon black, the fibrous carbon has an average particle of 10 to 200 nm, the particle with a graphene structure has an average particle diameter of 10 to 200 nm, and the carbon black has an average particle diameter of 10 to 80 nm, has a structure in which a plurality of primary particles is connected in a bead-like shape, and may have a crystal particle size of 2 to 5 nm.

The content of carbon may be 0.05 to 1.0 g/L.

A protic solvent may be used instead of the non-protic solvent, and in this case, the protic solvent may include one or more selected from the group consisting of water and alcohol, and one or more additives selected from the group consisting of polyvinyl pyrrolidone, a carboxymethylcellulose sodium salt, and sodium cholate may be added to the protic solvent.

In the present exemplary embodiment, the description of the solvent, the additive, the carbon, the dispersing process and the like is the same as that of the dry grinding process and the wet grinding and dispersing process in the third exemplary embodiment. However, the present exemplary embodiment is different from the third exemplary embodiment in that the present exemplary embodiment is not subjected to calcination process.

The sixth exemplary embodiment of the present invention may be a negative electrode material including a negative electrode active material, a conductive agent, a binder, and a solvent. The negative electrode material may be a slurry in which the negative electrode active material, the conductive agent, the binder, and the solvent are dispersed by a ball mill. The negative electrode active material may include one or more of the negative electrode active material in the first exemplary embodiment, and the negative electrode active material in the second exemplary embodiment. The conductive agent may include the conductive composition in the fourth exemplary embodiment. As the binder, it is possible to use polyvinylidene fluoride (PVDF) dissolved in N-methyl-2-pyrrolidone (NMP), styrene-butadiene rubber (SBR) dissolved in water, or carboxymethyl cellulose (CMC).

A seventh exemplary embodiment of the present invention may be a method for manufacturing a negative electrode material for a second battery, the method including: preparing a negative electrode active material; preparing a conductive agent; and manufacturing a slurry by mixing the negative electrode active material, the conductive agent and a binder with a solvent.

First, a negative electrode active material in a slurry state may be prepared according to the third exemplary embodiment. The negative electrode active material may be the negative electrode active material in the first exemplary embodiment, or may include the negative electrode active material in the second exemplary embodiment. Here, the description of the solvent, the additive, the carbon, the dispersing process and the like is the same as that of the dry grinding process and the wet grinding and dispersing process in the third exemplary embodiment. However, the present exemplary embodiment is different from the third exemplary embodiment in that the present exemplary embodiment is not subjected to calcination process.

Next, a conductive agent (a conductive composition) may be prepared according to the fifth exemplary embodiment. Next, a negative electrode material in a slurry state may be prepared by mixing a negative electrode active material in a slurry state with a conductive agent and a binder, and then uniformly dispersing the conductive agent and the binder through a method such as milling. As the binder, it is possible to use polyvinylidene fluoride (PVDF) dissolved in N-methyl-2-pyrrolidone (NMP), styrene-butadiene rubber (SBR) dissolved in water, or carboxymethyl cellulose (CMC). In the present exemplary embodiment, the description of the negative electrode active material, the conductive agent, the solvent, the binder and the like is the same as that of the previous exemplary embodiment.

Referring to FIG. 6, an eighth exemplary embodiment of the present invention may be a negative electrode structure 305 including a conductive metal (a current collector) 300 and a negative electrode material layer 304 formed on the conductive metal 300. The negative electrode material layer 304 may include the negative electrode material in the sixth exemplary embodiment. The negative electrode structure 305 may be formed by applying a negative electrode material on the current collector 300, and then drying the negative electrode material to remove the solvent. The negative electrode material layer 304 may be in a state where the negative electrode active material 304 is bonded to the conductive agent 303 by the binder 302. The current collector 300 is not particularly limited as long as the current collector 300 is a metal which has electronic conductivity, and is chemically stable to the electrolytic solution and the like, and copper, aluminum and the like may be specifically used.

Referring to FIG. 7, the ninth exemplary embodiment of the present invention may be a method for manufacturing a negative electrode structure, the method including: preparing a negative electrode material according to the seventh exemplary embodiment (first to fourth processes); applying the prepared negative electrode material on the conductive metal; and subjecting the applied negative electrode material to heat treatment (fifth process).

First, a negative electrode material (a slurry for an electrode coating) may be prepared according to the seventh exemplary embodiment (first to fourth processes). That is, a negative electrode material (a slurry for an electrode coating) in a slurry state may be prepared (a fourth process) by preparing a negative electrode active material in a slurry state according to the third exemplary embodiment (first to third processes, here, the description of the solvent, the additive, the carbon, the dispersing process and the like is the same as that of the dry grinding process and the wet grinding and dispersing process in the third exemplary embodiment. However, the present exemplary embodiment is different from the third exemplary embodiment in that the present exemplary embodiment is not subjected to calcination process), preparing the conductive agent (a conductive composition) according to the fifth exemplary embodiment, mixing a conductive agent and a binder with the negative electrode active material in the slurry state, and uniformly dispersing the conductive agent and the binder by a method such as a beads mill. In the fourth process, a slurry for forming an electrode layer may be manufactured by at least adding a binder or adding a conductive auxiliary agent or a solvent of a binder to a slurry of the silicon particles obtained in the third process.

The binder to be added in the fourth process is preferably a polymer selected from polyamic acid, polyimide, polyamideimide, and an epoxy resin when the solvent of the slurry is a non-protic solvent. When the solvent of the slurry is a protic solvent, it is preferred to use one or more polymers selected from a carboxymethylcellulose sodium salt, polyvinyl alcohol, and chitosan, and it is more preferred to cause the cross-linking reaction to induce crosslinking between polymers. Further, in the fourth process, a conductive auxiliary agent and a solvent for adjusting the viscosity may be added to a slurry for forming an electrode, and as the conductive auxiliary agent, it is possible to use one or more selected from the group consisting of graphite, graphene, carbon nanotube, carbon nanofiber, and amorphous carbon. The description of the negative electrode active material, the conductive agent, the solvent, the binder and the like is the same as that of the previous exemplary embodiment.

Next, a negative electrode structure may be manufactured by applying a negative electrode material (a slurry for an electrode coating) on a current collector at a predetermined thickness using a doctor blade method, drying the current collector to which the negative electrode material is applied, and performing heat treatment thereon. The drying temperature is preferably in a range of 80 to 120° in the atmosphere. An organic material such as a binder may be volatilized and removed while being subjected to heat treatment process. The heat treatment temperature is determined by the boiling point of the binder and the solvent. The heat treatment at 120° C. or more needs to be performed under vacuum (reduced pressure), or under inert gas atmosphere. When polyamic acid or polyamideimide of a precursor of polyimide is used as the binder, and N-methyl-2-pyrrolidone is used as the solvent, a temperature range of 180 to 350° C. is preferred, and the atmosphere is preferably an atmosphere under reduced pressure or an inert atmosphere. As a gas for creating the inert atmosphere, argon, nitrogen, or helium is preferred, but argon is more preferred.

Referring to FIG. 8, a tenth exemplary embodiment of the present invention may be a power storage device including the negative electrode structure 402 of the eighth exemplary embodiment, a separator 403, a positive electrode structure 405, and current collectors 401 and 404. Representative examples of the power storage device include a lithium secondary battery, and here, there are types such as a coin-type, a laminate-type and a cylinder-type. FIGS. 9 to 11 illustrate a cross-sectional views of coin-type, laminate-type, and cylinder-type lithium secondary batteries, respectively. As the separator, the positive electrode structure, and the current collector, those generally used may be adopted.

The eleventh exemplary embodiment of the present invention may be a method for manufacturing a power storage device (a secondary battery), the method including: preparing a negative electrode structure according to the ninth exemplary embodiment; and stacking the prepared negative electrode structure, a separator, and the positive electrode structure. The present exemplary embodiment describes a stack-type structure, but the present invention is not limited thereto, and may be applied to the winding-type, the coin-type and the like. The description of the separator, the positive electrode structure, the current collector and the like is the same as that of the previous exemplary embodiments.

Hereinafter, the present invention will be described in more detail with reference to Examples, Reference Examples, and Comparative Examples.

(Manufacture of Silicon-Carbon Composite)

Example M1

A silicon-carbon composite was manufactured according to the flowchart of FIG. 3 and the grinding system of FIG. 4.

As a starting material, a mixed powder, in which 95 parts by weight of a silicon power and 5 parts by weight of a graphite powder were mixed, was used. A silicon powder having a purity of 99% and an average particle diameter of 500 μm was used as the silicon powder, and a graphite powder having an average particle diameter of 20 μm was used as the graphite powder.

A quantitative feeder 201 was used to introduce the starting material into a dry beads mill 202, and the starting material was ground into an average diameter of 3 μm. A dry grinding was performed under nitrogen gas atmosphere by using zirconia beads having a particle diameter of 5 mm.

A solid-liquid mixture tank 204 was used to mix the powder obtained from the dry grinding with a cyclohexane solution in which 0.02 wt % of coal-tar pitch was dissolved, and a mixed solution was obtained by adding 0.05 wt % of an artificial graphite having an average particle diameter of 5 μm, 0.0025 wt % of a multilayer carbon nanotube having a diameter of 150 μm, and 0.2 wt % of $Li_2O$—$Al_2O_3$—$SiO_2$—$P_2O_5$—$TiO_2$ which is a lithium ion conductor (a lithium ion inorganic solid electrolyte) having an average particle diameter of 5 μm.

A pump 205 was used to supply the mixed solution to a first wet beads mill 209 filled with zirconia beads having a particle diameter of 0.5 mm via a first circulation tank 207, and a slurry was obtained by grinding an average slurry of the starting material for 1 hour while circulating the average slurry.

The slurry was stored in a second circulation tank 210, supplied to a second wet beads mill 212 filled with zirconia beads having a particle diameter of 0.03 mm, and ground. The slurry was ground for 2 hours while being circulated until the average particle diameter of the starting material became 400 nm, and the obtained slurry was stored in a ground product dispersion slurry tank 213. Subsequently, after cyclohexane was added to the obtained slurry to adjust the concentration of silicon to 10 wt %, cyclohexane was added to the slurry obtained by allowing the resulting mixture to pass through a third circulation tank (not illustrated), supplying the mixture to a wet beads mill filled with zirconia beads having a particle diameter of 0.1 mm, and grinding the slurry for 2.5 hours while circulating the slurry, so as to adjust the concentration of silicon to 5 wt %, the slurry was ground for 2 hours while being circulated by allowing the slurry to pass through the circulation tank and supplying the slurry to a wet beads mill filled with zirconia beads having a particle diameter of 0.05 mm, and then a slurry, in which silicon particles, carbon particles, and ion conductor particles were dispersed, was obtained.

The ground dispersed slurry was dried in a vacuum dryer to remove cyclohexane and obtain a mixture of silicon-lithium ion inorganic solid electrolyte-graphite-coal-tar pitch.

The mixture was subjected to heat treatment under the condition of 800° C. under an argon gas atmosphere in a firing furnace, thereby manufacturing a silicon-lithium ion inorganic solid electrolyte-carbon composite.

Example M2

N-methyl-2-pyrrolidone as a dispersion medium was introduced into a first circulation tank 207 and dispersed therein such that a metal silicon powder having a purity of 99% and a particle diameter of 300 μm or less as the starting raw material has a concentration of 20 wt %, and zirconia beads having a size of 0.5 mm as a first wet beads mill 209 were used to grind the resulting mixture for 1.5 hours while circulating the resulting mixture under a nitrogen gas atmosphere until the average particle diameter of the silicon particles became 400 nm. Subsequently, the obtained slurry was allowed to pass through a second circulation tank 210 and was supplied to a second wet beads mill 212 filled with zirconia beads having a particle diameter of 0.3 mm to grind the slurry for 2.5 hours while circulating the slurry by a peristaltic pump 211. Subsequently, N-methyl-2-pyrrolidone was added to the obtained slurry, the resulting mixture was allowed to pass through a third circulation tank filled with zirconia beads having a particle diameter of 0.1 mm and was supplied to a third wet beads mill filled with zirconia beads having a particle diameter of 0.1 mm, and the slurry was ground for 2.5 hours while being circulated by adding coal-tar pitch thereto so as to have a concentration of 0.1 wt % with respect to silicon, thereby obtaining a slurry of silicon particles having an average particle diameter of 180 nm. The obtained slurry was dried to obtain an average particle diameter of 50 to 200 nm observed by scanning electron microscopy. As the scanning electron microscope, JSM-7400F manufactured by Jeol Ltd., was used.

Example M3

N-methyl-2-pyrrolidone was added to the slurry obtained in Example M2 to adjust the concentration of silicon to 5 wt %, and then the slurry was allowed to pass through a circulation tank and supplied to a wet beads mill filled with zirconia beads having a particle diameter of 0.05 mm, so as to grind the slurry for up to 3 hours while circulating the slurry, but the slurry was not ground until an average particle diameter of 110 nm or less 1 hour after the grinding began to be performed. Then, coal-tar pitch was added in an amount of 0.04 wt % based on the weight of silicon and the resulting mixture was further ground for 1 hour, and as a result, a slurry having an average particle diameter of which the silicon particles was reduced to 65 nm could be obtained. The obtained slurry was dried, and the particle diameters observed by scanning electron microscopy were 30 to 100 nm, and particles having a minimum of 5 nm were also observed by—transmission electron microscopy.

Example M4

A silicon-carbon composite was obtained under the same conditions as in Example M2, except that ethyl alcohol in which 0.1 wt % of polyvinyl pyrrolidone was dissolved was used as the solvent instead of an N-methyl-2-pyrrolidone solution in which 0.1 wt % of coal-tar pitch was dissolved.

Reference Example M1

In Example M2, a silicon slurry was obtained by grinding the slurry to a median diameter of 400 nm for 1.5 hours while circulating the slurry under nitrogen atmosphere using zirconia beads having a size of 0.5 mm in the first wet beads mill 209.

Reference Example M2

In Example M1, coal-tar pitch was not added to cyclohexane. A silicon-carbon composite was obtained in the same manner as in Example M1, except for the above matter.

Comparative Example M1

A wet grinding process, in which a metal silicon having an average particle diameter of 20 μm was used as a starting material and ethanol was used as a medium, was performed instead of performing the dry grinding process in Example M1. Subsequently, a dry silicon powder was manufactured by performing a dispersing process, performing the desolvation, and then grinding the slurry.

Subsequently, a silicon-carbon composite was manufactured by dispersing the dry silicon powder in a cyclohexane solution in which 2 wt % of coal-tar pitch was dissolved, drying the dispersion under reduced pressure, and then performing heat treatment at 800° C. under an argon gas atmosphere.

(Evaluation of Silicon-Carbon Composite)

For the manufactured silicon-carbon composite, the size, distribution state, and oxygen content of the silicon (Si) particles were analyzed and evaluated by using scanning electron microscopy (SEM), transmission electron microscopy (TEM), energy dispersive spectrometer (EDS) related to the transmission electron microscopy, and electron energy loss spectrometer (EELS), and the results are shown below.

The aggregation size of the silicon particles was Comparative Example M1>Reference Example M1>Reference Example M2>Example M2>Example M1 in this order.

The larger amount of $SiO_x$ was Comparative Example M1>Reference Example M1>Example M2>Reference Example M1>Example M1 in this order.

The particle size of the silicon particles was Comparative Example M1>Reference Example M2>Reference Example M1>Example M2>Example M1 in this order.

According to the results, it can be confirmed that according to the manufacturing method of the present invention, silicon may be further pulverized, silicon particles are uniformly dispersed in the internal structure of the obtained silicon-carbon composite, and the oxygen content is also small.

(Manufacture of Negative Electrode Structure)

Example E1 and the Like

An artificial graphite having an average particle diameter of 5 μm according to Example M1, Example M2, Reference Example M1, Reference Example M2, and Comparative Example M1, a multilayer carbon nanotube having a diameter of 150 nm, and polyamic acid were added and mixed so as to have 26 parts by weight of silicon, 49 parts by weight of the artificial graphite, 12 parts by weight of carbon nanotube, and 12 parts by weight of the polyamic acid solid content, the mixture was kneaded, and then a slurry for forming an electrode layer was manufactured.

The slurry was applied on a copper foil having a thickness of 17 μm using an applicator, and dried at 110° C. for 0.5 hour, the thickness and the density was adjusted by a roll press, and a negative electrode active material layer having a thickness of 20 to 40 μm and a density of 0.9 to 1.2 g/cm$^3$ was formed on a copper foil current collector to manufacture a negative electrode structure.

The negative electrode structures manufactured of the silicon-carbon composites of Example M1, Example M2, Reference Example M1, Reference M2, and Comparative Example M1 were referred to as the negative electrode structures of Example EM1, Example EM2, Reference Example EM1, Reference Example EM2, and Comparative Example EM1, respectively.

(Evaluation of Amount of Electrochemical Lithium Inserted into Negative Electrode Structure)

The negative electrode structure was used as a single electrode to evaluate the amount of electrochemical lithium inserted as follows.

A coin-type cell, in which each of the negative electrode structures of Example EM1, Example EM2, Reference Example EM1, Reference Example EM2, and Comparative Example EM1 was pressed to a predetermined size and used as a working electrode, and the metal lithium was used as a counter electrode, was manufactured, and the amount of the inserted electrochemical lithium of each negative electrode structure was evaluated. The lithium electrode was manufactured by compressing a metal lithium foil having a thickness of 140 μm on a nickel foil expanded metal, and pressing the compressed product to a predetermined size.

A coin-type evaluation cell was manufactured as follows (see FIG. 9). That is, the negative electrode structure was inserted into a positive electrode can 507 under a dry atmosphere with a dew point of −50° C. or less, polyethylene films having a porosity of 40% with a microporous structure at a thickness of 17 μm as a separator were disposed to overlap each other, and a polypropylene gasket 508 was formed. Subsequently, an electrolytic solution was added dropwise to the separator to form an ion conductor (a separator) 503. Subsequently, lithium negative electrodes 502 and 501 were overlapped with each other, and the lid was covered with a negative electrode cap 506 and caulked by a caulking device, thereby manufacturing an evaluation cell. As the electrolytic solution, a solution, which was obtained by dissolving 1 M (mol/l) of lithium phosphate hexafluoride ($LiPF_6$) in a solvent in which ethylene carbonate from which moisture was sufficiently removed and diethyl carbonate were mixed at a volume ratio of 3:7, was used.

The amount of electrochemical lithium inserted was evaluated as follows. The evaluation was performed by using the lithium electrode as a negative electrode and each working electrode as a positive electrode, discharging the battery until the cell voltage became 0.01 V, and charging the battery until the cell voltage became 1.50 V. That is, the amount of electricity discharged was defined as the amount of electricity used to insert lithium, and the amount of electricity charged was defined as the amount of electricity used to release lithium.

For the charging and discharging, discharging-charging was performed once at an electric current of 0.05 C and 50 times at an electric current of 0.5 C, evaluations were performed on the amount of Li inserted (amount of electricity) once, the amount of Li released (amount of electricity) once, the ratio (%) of the amount of Li released to the amount of Li inserted once, the amount of Li released (amount of electricity) at the tenth time to the amount once, the amount of Li released (amount of electricity) at the fiftieth time to the tenth time, and Li insertion and desorption (or release) of a negative electrode composed of various active materials, and the results are shown below.

The largest amount of Li inserted once was Comparative Example EM1>Reference Example EM1>Reference Example EM2>Example EM2>Example EM1 in this order.

The largest values for the amount of Li released once and the ratio (%) of the amount of Li released to the amount of Li inserted once were Example EM1>Reference Example EM1>Example EM2>Reference Example EM2>Comparative Example EM1 in this order.

The largest values for the amount of Li released at the tenth time to the first time and the amount of Li released at the fiftieth time to the tenth time were Example EM1>Example EM2>Reference EM1>Reference Example EM2>Comparative Example EM1 in this order.

Referring to the results, it can be confirmed that in overall consideration of charging and discharging capacities and charging and discharging repetition characteristics, the negative electrode structure according to the present invention has good performance.

Table 1 shows the comparison of current characteristics of the amount of Li desorbed (capacity) in Example EM2 and Reference Example EM1. However, for the amount of Li desorbed at each current value, the capacity at a current value of 0.05 C was standardized at 1.0.

TABLE 1

| Current value (C-rate) | Capacity (mAh/g) in Reference Example EM1/Capacity (mAh/g) at 0.05 C | Capacity (mAh/g) in Example EM2/Capacity (mAh/g) at 0.05 C |
|---|---|---|
| 0.1 C | 0.81 | 0.95 |
| 0.2 C | 0.69 | 0.87 |
| 0.5 C | 0.37 | 0.68 |
| 1.3 C | — | 0.51 |

Referring to Table 1, it can be seen that an electrode (Example EM2), which was manufactured by using a silicon particle having an average particle diameter of up to 180 nm obtained by adding coal-tar pitch and grinding the silicon particles, had good current rate characteristics of the amount of lithium desorbed, and had a larger amount of lithium desorbed at a higher current.

(Manufacture of Power Storage Device)

As a power storage device, a coin-type lithium secondary battery was manufactured, and the performance was evaluated. FIGS. 8 to 10 illustrate a coin-type cell, a laminate or pouch cell, and a cylinder-type cell as an example of the lithium secondary battery. Each of the negative electrode structures of Example EM2, Reference Example EM1, Reference Example EM2, and Comparative Example EM1 was pressed to a predetermined size and used in the negative electrode, thereby manufacturing each coin-type cell. All the coin-type cells were assembled under a dry atmosphere with a dew point of −50° C. or less.

Referring to FIG. 9, the process of manufacturing the coin cell will be described. First, a positive electrode previously manufactured was inserted in a positive electrode can 507, polyethylene films having a porosity of 40% with a microporous structure at a thickness of 17 μm as a separator were disposed to overlap each other, a polypropylene gasket 508 was set, an electrolytic solution was added dropwise to the separator to form an ion conductor (separator) 503, and then negative electrodes 502 and 501 were overlapped with each other, and the lid was covered with a negative electrode cap 506 and was caulked in advance by a caulking device, thereby manufacturing a coin cell.

Each of the coin cells, which were manufactured by using, as a negative electrode, each negative electrode structure of Example EM2, Reference Example EM1, Reference Example EM2, and Comparative Example EM1 formed by using each silicon-carbon composite of Example M1, Example M2, Reference Example M1, Reference Example M2, and Comparative Example M1 as a material for a negative electrode active material, was used as each power storage device for Example DM2, Reference Example DM1, Reference Example DM2, and Comparative Example DM1.

As the electrolytic solution, a solution, which was obtained by dissolving 1 M (mol/l) of lithium phosphate hexafluoride (LiPF$_6$) in a solvent in which ethylene carbonate from which moisture was sufficiently removed and diethyl carbonate were mixed at a volume ratio of 3:7, was used.

(Manufacture of Positive Electrode Structure)

A positive electrode structure used as a positive electrode of the power storage device of the present invention was manufactured as follows.

A slurry for forming a positive electrode active material layer was manufactured by mixing 100 parts by weight of lithium nickel cobalt manganese oxide (LiNi$_{1/3}$Co$_{1/3}$Mn$_{1/3}$O$_2$) with 4 parts by weight of acetylene black, adding 50 parts by weight of an N-methyl-2-pyrrolidone solution containing 10 wt % of polyvinylidene fluoride and 50 parts by weight of N-methyl-2-pyrrolidone thereto, and dispersing the mixture by a wet beads mill.

Subsequently, the slurry was applied on an aluminum foil having a thickness of 14 μm using a coater, dried at 110° C. for 1 hour, and then dried at 150° C. under further reduced pressure.

Subsequently, the thickness was adjusted by a roll press machine to manufacture a positive electrode structure in which a positive electrode active material layer having a thickness of 82 μm and a density of 3.2 g/cm$^3$ was formed on an aluminum foil current collector. The positive electrode structure was pressed to a predetermined size, thereby manufacturing a LiNi$_{1/3}$Co$_{1/3}$Mn$_{1/3}$O$_2$ positive electrode structure.

(Evaluation of Charging and Discharging Test)

After the power storage device was used to charge the battery until the cell voltage becomes 4.2 V at a constant current density of 0.2 C, the charging and discharging, in which the battery was charged at a constant voltage of 4.2 V and rested for 10 minutes, and then was discharged until the cell voltage became 2.7 V at a constant current density of 0.2 C and stopped for 10 minutes, was repeated three times, and then charging and discharging characteristics were evaluated by repeating charging and discharging 100 times at a current density of 1 C, and the results are shown below.

The largest amount of electricity discharged at the 100th time was Example DM1>Example DM2>Reference Example DM1>Reference Example DM2>>Comparative Example DM1 in this order.

Referring to the results, it can be confirmed that in overall consideration of charging and discharging capacities and charging and discharging repetition characteristics, the negative electrode according to the present invention has good performance.

The terms used in the present invention are provided to describe particular examples, but are not intended to limit the present invention. Unless otherwise explicitly indicated in the context, the singular expression is deemed to include the meaning of a plural expression. The term "comprise" or "have" means the presence of features, numbers, steps, movements, constituent elements, or combinations thereof, which are described in the specification, not the exclusion thereof. The present invention is not limited to the above-described exemplary embodiments and the accompanying drawings, but is limited to the accompanying claims. Accordingly, various forms of substitutions, modifications, and alterations may be made by the person skilled in the art without departing from the technical spirit of the present invention described in the claims, and these substitutions, modifications, and alterations are considered as being within the scope of the present invention.

The invention claimed is:

1. A method for manufacturing a negative electrode active material, the method comprising:
   a dry grinding process of performing a dry grinding on a silicon starting material under an inert atmosphere to prepare a dry ground product of which a surface is prevented from being oxidized; and a wet grinding and dispersing process of putting the dry ground product, an added material, and an additive into a solvent, and then performing a wet grinding on the mixture and dispersing the mixture to manufacture a slurry, wherein at least one of the dry grinding process and the wet grinding and dispersing process is performed by a beads mill process, and wherein the wet grinding process is performed such that the starting material has an average particle diameter of 5 nm to 200 nm.

2. The method of claim 1, wherein the added material is one or more selected from the group consisting of graphite, graphene, carbon nanotube, carbon fiber, amorphous carbon, and a lithium ion solid electrolyte, and wherein the additive is one or more selected from the group consisting of coal-tar pitch and a polycyclic aromatic compound.

3. The method of claim 2, wherein the lithium ion solid electrolyte is one or more selected from the group consisting of a sulfur-based amorphous electrolyte comprising $Li_2S$—$P_2O_5$, a sulfur-containing glass, lithium nitride ($Li_3N$), a material with a NASICON structure comprising $Li_{1+x+y}Al_xTi_{2-x}Si_yP_{3-y}O_{12}$ (x=0.3, y=0.2), a material with a garnet structure comprising $Li_7La_3Zr_2O_{12}$, and a germanium-phosphorus-sulfur compound comprising $Li_{10}GeP_2S_{12}$.

4. The method of claim 1, wherein the solvent comprises a non-protic solvent having no proton donor ability or a protic solvent having proton donor ability, wherein the non-protic solvent is one or more selected from the group consisting of a cyclic hydrocarbon, an aromatic compound, a ketone-based solvent, an ether-based solvent, an ester-based solvent, an amide-based solvent, and a nitrile-based solvent, and wherein the protic solvent is one or more selected from the group consisting of alcohol and water.

5. The method of claim 1, further comprising: a calcination process of obtaining a negative electrode active material by calcining the manufactured slurry after the wet grinding and dispersing process, wherein the calcination process is performed under reduced pressure or under an inert atmosphere.

6. A conductive composition for a secondary battery, in which carbon is dispersed in a solvent, wherein the solvent is a non-protic solvent having no proton donor ability or a protic solvent having proton donor ability, wherein the non-protic solvent is one or more selected from the group consisting of a hydrocarbon, an aromatic compound, a ketone-based solvent, an ether-based solvent, an ester-based solvent, an amide-based solvent, and a nitrile-based solvent, wherein the protic solvent is one or more selected from the group consisting of water and alcohol, wherein the carbon is one or more selected from the group consisting of fibrous carbon, a carbon particle with a graphene structure, and carbon black, and wherein one or more additives are added, the additives selected from the group consisting of coal-tar pitch and a polycyclic aromatic compound.

7. The conductive composition of claim 6, wherein the fibrous carbon has an average diameter of 10 to 200 nm, the particle with a graphene structure has an average particle diameter of 10 to 200 nm, and the carbon black has an average particle diameter of 10 to 80 nm, has a structure in which a plurality of primary particles is connected in a bead-like shape, and has a crystal particle size of 2 to 5 nm.

8. The conductive composition of claim 6, wherein the carbon has a content of 0.05 to 1.0 g/L.

9. A negative electrode material for a secondary battery comprising:

a negative electrode active material comprising:

a silicon particle or a silicon-carbon composite comprising the silicon particle and carbon, wherein the silicon particle has an average particle diameter of 5 to 200 nm, wherein the silicon particle is manufactured through a dry grinding under an inert atmosphere to prevent the surface from being oxidized, wherein the silicon-carbon composite has an average particle diameter of 5 to 20 μm;

wherein the carbon is one or more selected from the group consisting of a carbon particle with a graphene structure having an average particle diameter of 300 nm to 10 μm, a fibrous carbon having an average diameter of 10 to 200 nm, and carbon black having a primary particle with a bead-like connected structure, the primary particle having an average particle diameter of 10 to 80 nm and a crystal size of 2 to 5 nm, and wherein the carbon particle with a graphene structure is one or more selected from the group consisting of graphene and graphite, and wherein the fibrous carbon is one or more selected from the group consisting of carbon nanofiber and carbon nanotube; and an amorphous surface layer comprising amorphous carbon on a surface of the silicon particle, the amorphous surface layer having a thickness of 1 to 10 nm;

a conductive composition comprising carbon dispersed in a solvent, wherein the solvent is a non-protic solvent having no proton donor ability or a protic solvent having proton donor ability, wherein the non-protic solvent is one or more selected from the group consisting of a hydrocarbon, an aromatic compound, a ketone-based solvent, an ether-based solvent, an ester-based solvent, an amide-based solvent, and a nitrile-based solvent, wherein the protic solvent is one or more selected from the group consisting of water and alcohol, wherein the carbon is one or more selected from the group consisting of fibrous carbon, a carbon particle with a graphene structure, and carbon black, and wherein one or more additives are added, the additives selected from the group consisting of coal-tar pitch and a polycyclic aromatic compound;

and a binder mixed with a solvent.

* * * * *